(12) United States Patent
Uemura et al.

(10) Patent No.: US 10,009,897 B2
(45) Date of Patent: Jun. 26, 2018

(54) MOBILE STATION APPARATUS, BASE STATION APPARATUS, COMMUNICATION SYSTEM, MOBILE STATION APPARATUS CAPABILITY NOTIFICATION METHOD, AND INTEGRATED CIRCUIT

(75) Inventors: Katsunari Uemura, Osaka (JP); Yasuyuki Kato, Osaka (JP)

(73) Assignee: SHARP KABUSHIKI KAISHA, Sakai (JP)

( * ) Notice: Subject to any disclaimer, the term of this patent is extended or adjusted under 35 U.S.C. 154(b) by 163 days.

(21) Appl. No.: 14/125,992

(22) PCT Filed: Jun. 15, 2012

(86) PCT No.: PCT/JP2012/065342
§ 371 (c)(1),
(2), (4) Date: Dec. 13, 2013

(87) PCT Pub. No.: WO2012/176703
PCT Pub. Date: Dec. 27, 2012

(65) Prior Publication Data
US 2014/0140318 A1 May 22, 2014

(30) Foreign Application Priority Data
Jun. 21, 2011 (JP) .................................. 2011-137017

(51) Int. Cl.
*H04W 72/04* (2009.01)
*H04W 8/24* (2009.01)
(Continued)

(52) U.S. Cl.
CPC ........... *H04W 72/048* (2013.01); *H04W 8/24* (2013.01); *H04W 28/18* (2013.01); *H04W 72/1284* (2013.01)

(58) Field of Classification Search
CPC ........... H04W 72/048; H04W 72/1284; H04W 28/18; H04W 56/0005; H04W 88/02; H04W 88/08; H04W 8/24
See application file for complete search history.

(56) References Cited

U.S. PATENT DOCUMENTS

| | | | | |
|---|---|---|---|---|
| 2011/0103332 A1* | 5/2011 | Kuo | ........................ | H04L 5/001 370/329 |
| 2012/0008600 A1* | 1/2012 | Marinier | ................. | H04L 5/001 370/336 |

(Continued)

FOREIGN PATENT DOCUMENTS

| | | |
|---|---|---|
| CN | 102045763 A | 5/2011 |
| WO | 2011/043396 A1 | 4/2011 |

(Continued)

OTHER PUBLICATIONS

Official Communication issued in International Patent Application No. PCT/JP2012/065342, dated Jul. 17, 2012.

(Continued)

*Primary Examiner* — Rina C Pancholi
(74) *Attorney, Agent, or Firm* — Keating & Bennett, LLP

(57) ABSTRACT

An object of the invention is to provide a mobile station apparatus, a base station apparatus, a communication system, a mobile station apparatus capability notification method, and an integrated circuit, which enable uplink transmission timing support information of the mobile station apparatus to be effectively notified to the base station apparatus. The mobile station apparatus that is connected to the base station apparatus by aggregating a plurality of cells of which frequencies are different from each other transmits capability information in which information related to an uplink transmission timing supported by the mobile station apparatus is associated with the plurality of frequencies (Continued)

supported by the mobile station apparatus, to the base station apparatus.

20 Claims, 14 Drawing Sheets

(51) Int. Cl.
*H04W 72/12* (2009.01)
*H04W 28/18* (2009.01)

(56) References Cited

U.S. PATENT DOCUMENTS

| | | | | |
|---|---|---|---|---|
| 2012/0040687 | A1* | 2/2012 | Siomina | G01S 5/0205 455/456.1 |
| 2012/0176967 | A1* | 7/2012 | Kim | H04W 76/066 370/328 |
| 2012/0178465 | A1* | 7/2012 | Lin | H04W 24/10 455/450 |
| 2012/0257588 | A1 | 10/2012 | Umeda et al. | |
| 2012/0294287 | A1* | 11/2012 | Jeong | H04L 5/001 370/331 |
| 2014/0112298 | A1 | 4/2014 | Oh | |

FOREIGN PATENT DOCUMENTS

| | | |
|---|---|---|
| WO | 2011/052447 A1 | 5/2011 |
| WO | 2011/085200 A1 | 7/2011 |
| WO | 2012/046171 A1 | 4/2012 |

OTHER PUBLICATIONS

NTT Docomo, Inc., "CA Support for multi-TA", 3GPP TSG-RAN2#69, R2-101567, Feb. 22-26, 2010, 12 pages, San Francisco, CA.

Nokia Siemens Networks et al., "UE Capability Signalling for CA and MIMO in REL10", 3GPP TSG-RAN WG2 Meeting #72, R2-106892, Nov. 15-19, 2010, 11 pages, Jacksonville, FL.

Samsung, "Clarification on bandEUTRA-r10 and supportedBandListEUTRA", 3GPP TSG-RAN2 Meeting #74, R2-112772, May 9-13, 2011, 7 pages, Barcelona, Spain.

InterDigital Communications,"Support for Multiple Timing Advance in LTE CA", 3GPP TSG-RAN WG2 #74, Tdoc R2-113255, May 9-13, 2011, 5 pages, Barcelona, Spain.

Huawei et al., "Discussion on TA group Management", 3GPP TSG-RAN WG2 Meeting #74, R2-113285, May 9-13, 2011, 4 pages, Barcelona, Spain.

* cited by examiner

FIG. 7

| Support List of UL timing for Band Combination |
|---|
| BandCombinationParameters#1 |
|     Number of UL timing for Combination#1 |
| BandCombinationParameters#2 |
|     Number of UL timing for Combination#2 |
| BandCombinationParameters#3 |
|     Number of UL timing for Combination#3 |
| BandCombinationParameters#4 |
|     Number of UL timing for Combination#4 |

FIG. 8

| Support list of UL timing for Band |
|---|
| bandEUTRA#1 |
|     Number of UL timing for Band#1 |
| bandEUTRA#2 |
|     Number of UL timing for Band#2 |
| bandEUTRA#3 |
|     Number of UL timing for Band#3 |
| bandEUTRA#4 |
|     Number of UL timing for Band#4 |

FIG. 9

| Support indication of UL timing for Band Combination |
|---|
| BandCombinationParameters#1 |
| True / False |
| BandCombinationParameters#2 |
| True / False |
| BandCombinationParameters#3 |
| True / False |
| BandCombinationParameters#4 |
| True / False |

FIG. 10

| Support indication of UL timing for Band |
|---|
| bandEUTRA#1 |
| True / False |
| bandEUTRA#2 |
| True / False |
| bandEUTRA#3 |
| True / False |
| bandEUTRA#4 |
| True / False |

| Tx RF#1 support band | Band#1 |
|---|---|
| Tx RF#2 support band | Band#1, Band5 |

FIG. 15

| RF BandCombination#1 | Band#1, Band#1 |
| --- | --- |
| RF BandCombination#2 | Band#1, Band#5 |
| RF BandCombination#3 | Band#1 |
| RF BandCombination#4 | Band#5 |

MOBILE STATION APPARATUS, BASE STATION APPARATUS, COMMUNICATION SYSTEM, MOBILE STATION APPARATUS CAPABILITY NOTIFICATION METHOD, AND INTEGRATED CIRCUIT

TECHNICAL FIELD

The present invention relates to a mobile station apparatus, a base station apparatus, a communication system, a mobile station apparatus capability notification method, and an integrated circuit, which enable uplink transmission timing support information of the mobile station apparatus to be effectively notified to the base station apparatus in a case where the mobile station apparatus supports transmission in a plurality of uplink transmission timings.

BACKGROUND ART

In the 3rd Generation Partnership Project (3GPP) which is a standardization project, a standardization of Evolved Universal Terrestrial Radio Access (hereafter, called "EUTRA") is performed, in which a high speed communication is realized by adopting an Orthogonal Frequency-Division Multiplexing (OFDM) communication system and flexible scheduling with a predetermined frequency and time unit called a resource block.

In addition, in the 3GPP, a discussion on an Advanced EUTRA that realizes the high speed data transmission and has an forward ward compatibility of EUTRA is in progress. As a technology in the Advanced EUTRA, carrier aggregation is proposed. "Carrier aggregation" is a technology that a transmission rate can be improved by aggregately using a plurality of different frequencies (also called component carriers). In addition, it is proposed that the mobile station apparatus which is in communication with the base station apparatus by using carrier aggregation has a plurality of uplink transmission timings (timing advance) for each frequency or for each component carrier (NPL 1 described below).

In EUTRA, in order to adjust the uplink transmission timing of the mobile station apparatus, a random access procedure is provided. In the random access procedure, there are two methods: one is a method in which the mobile station apparatus autonomously determines the necessity of the random access procedure and initiates the procedure; and the other is a method in which, in order to cause a specific mobile station apparatus to initiate the random access procedure, the base station apparatus configures information indicating the initiation of the random access procedure in a physical downlink control channel, and transmits the information to the mobile station apparatus.

In addition, in the 3GPP, in a case where the mobile station apparatus aggregates a plurality of different frequencies with respect to the base station apparatus, a mobile station apparatus capability (UE capability) notification method that indicates which frequencies can be aggregated, is provided. In the notification (report) of the mobile station apparatus capability, a frequency band that is supported by the mobile station apparatus upon carrier aggregation, a combination of the aggregated frequency bands, and a relationship of radio parameters between the uplink and the downlink in the combination of each frequency band, are described in NPL 2 described below.

In addition, the base station apparatus configures a cell by combining a downlink component carrier and an uplink component carrier. Moreover, the base station apparatus can also configure a cell by only a downlink component carrier.

CITATION LIST

Non Patent Literature

NPL 1: R2-101567, NTT DOCOMO, 3GPP TSG-RAN WG2#69, 22-26 Feb. 2010, San Francisco, USA
NPL 2: R2-112772, Samsung, 3GPP TSG-RAN WG2#74, 09-13 May 2011, Barcelona, Spain

SUMMARY OF INVENTION

Technical Problem

However, in the mobile station apparatus capability notification method in the related art, there is a problem in that, there is no information indicating whether or not the mobile station apparatus supports the transmission in a plurality of uplink transmission timings, and the base station apparatus configures the plurality of uplink transmission timings with respect to the mobile station apparatus which does not support the transmission in the plurality of uplink transmission timings.

In addition, when the notification method is configured to only notify information indicating whether or not the mobile station apparatus supports the transmission in the plurality of uplink transmission timings, the base station apparatus cannot determine that the mobile station apparatus can support the plurality of uplink transmission timings in which combination of frequency bands. For this reason, there has been a problem in that the base station apparatus configures a plurality of uplink transmission timings with respect to a frequency band which does not support the transmission in a plurality of uplink transmission timings.

An object of the present invention is to provide a mobile station apparatus, a base station apparatus, a communication system, a mobile station apparatus capability notification method, and an integrated circuit, which enable supported uplink transmission timing information of the mobile station apparatus to be effectively notified to the base station apparatus in a case where the mobile station apparatus supports transmission in a plurality of uplink transmission timings.

Solution to Problem (1) In order to solve the problems described above, the invention takes the following steps. That is, a mobile station apparatus according to the invention is connected to a base station apparatus by aggregating a plurality of cells of which frequencies are different from each other. The mobile station apparatus transmits capability information in which information related to an uplink transmission timing supported by the mobile station apparatus is associated with the plurality of frequencies supported by the mobile station apparatus, to the base station apparatus.

(2) In addition, in a case where the plurality of cells are aggregated, the capability information in the mobile station apparatus according to the invention is the number of supported uplink transmission timings which are applied to all the combinations of the frequencies supported by the mobile station apparatus.

(3) In addition, in a case where the plurality of cells are aggregated, the capability information in the mobile station apparatus according to the invention is the number of supported uplink transmission timings which are applied to each combination of the frequencies supported by the mobile station apparatus.

(4) In addition, the number of transmission timing supports in the mobile station apparatus according to the invention configures a list that indicates the number of supported uplink transmission timings which correspond to each combination of the frequencies supported by the mobile station apparatus.

(5) In addition, in a case where the plurality of cells are aggregated, the capability information in the mobile station apparatus according to the invention is an indication of the plurality of supported uplink transmission timings which correspond to each combination of the frequencies supported by the mobile station apparatus.

(6) In addition, the indication in the mobile station apparatus according to the invention configures a list of indications which correspond to each combination of the frequencies supported by the mobile station apparatus.

(7) In addition, in a case where the plurality of cells are aggregated, the capability information in the mobile station apparatus according to the invention is the number of supported uplink transmission timings which are applied to each frequency supported by the mobile station apparatus.

(8) In addition, the number of transmission timing supports in the mobile station apparatus according to the invention configures a list of the number of supported uplink transmission timings which correspond to each frequency supported by the mobile station apparatus.

(9) In addition, in a case where the plurality of cells are aggregated, the capability information in the mobile station apparatus according to the invention is an indication of the plurality of supported uplink transmission timings which correspond to each frequency supported by the mobile station apparatus.

(10) In addition, the indication in the mobile station apparatus according to the invention configures a list of indications which correspond to each frequency supported by the mobile station apparatus.

(11) In addition, in a case where the plurality of cells are aggregated, the capability information in the mobile station apparatus according to the invention is an indication of the plurality of supported uplink transmission timings which correspond to each type of combination of the frequencies supported by the mobile station apparatus.

(12) A base station apparatus according to the invention communicates with the mobile station apparatus by aggregating a plurality of cells of which frequencies are different from each other. The base station apparatus receives capability information in which information related to an uplink transmission timing supported by the mobile station apparatus is associated with the plurality of frequencies supported by the mobile station apparatus, and determines whether the plurality of cells of which the uplink transmission timings are different from each other can be aggregated or not based on the capability information.

(13) In addition, the base station apparatus according to the invention determines whether the plurality of cells of which the uplink transmission timings are different from each other can be aggregated or not with respect to each combination of the frequencies supported by the mobile station apparatus.

(14) In addition, the base station apparatus according to the invention determines whether the plurality of cells of which the uplink transmission timings are different from each other can be aggregated or not with respect to each frequency supported by the mobile station apparatus.

(15) In addition, the base station apparatus according to the invention determines whether the plurality of cells of which the uplink transmission timings are different from each other can be aggregated or not with respect to each type of combination of the frequencies supported by the mobile station apparatus.

(16) In addition, in a case where the plurality of cells of which the uplink transmission timings are different from each other are aggregated, the base station apparatus according to the invention performs to configure random access configuration with respect to the mobile station apparatus for implementing a random access procedure with respect to the cells.

(17) In addition, in a case where the plurality of cells of which the uplink transmission timings are different from each other are aggregated, the base station apparatus according to the invention configures, to the mobile station apparatus, group identifiers which indicate a group of uplink transmission timings with respect to the cells.

(18) In addition, in a case where the plurality of cells of which the uplink transmission timings are different from each other are aggregated, the base station apparatus according to the invention causes the mobile station apparatus to initiate the random access procedure for acquiring the uplink transmission timing of the cells.

(19) In addition, a communication system according to the invention is a system in which a mobile station apparatus and a base station apparatus communicate by aggregating a plurality of cells of which frequencies are different from each other. The mobile station apparatus configures the capability information in which information related to an uplink transmission timing supported by the mobile station apparatus is associated with the plurality of frequencies supported by the mobile station apparatus, in the mobile station apparatus capability message and transmits the capability information to the base station apparatus.

(20) In addition, a communication system according to the invention is a system in which a mobile station apparatus and a base station apparatus communicate with each other by aggregating a plurality of cells of which frequencies are different from each other. The mobile station apparatus transmits capability information in which information related to an uplink transmission timing supported by the mobile station apparatus is associated with the plurality of frequencies supported by the mobile station apparatus, to the base station apparatus, and the base station apparatus receives the capability information and determines whether the plurality of cells of which the uplink transmission timings are different from each other can be aggregated or not, based on the capability information.

(21) In addition, a mobile station apparatus capability notification method according to the invention is a method in the communication system in which a mobile station apparatus and a base station apparatus communicate with each other by aggregating a plurality of cells of which frequencies are different from each other. The mobile station apparatus capability notification method includes a step of transmitting the capability information in which information related to an uplink transmission timing supported by the mobile station apparatus is associated with the plurality of frequencies supported by the mobile station apparatus, to the base station apparatus by the mobile station apparatus.

(22) In addition, a mobile station apparatus capability notification method according to the invention is a method in the communication system in which a mobile station apparatus and a base station apparatus communicate with each other by aggregating a plurality of cells of which frequencies are different from each other. The mobile station apparatus capability notification method includes: a step of transmitting the capability information in which information related to an uplink transmission timing supported by the mobile station apparatus is associated with the plurality of frequencies supported by the mobile station apparatus, to the base station apparatus by the mobile station apparatus; a step of receiving the capability information by the base station apparatus; and a step of determining whether the plurality of cells of which the uplink transmission timings are different from each other can be aggregated or not, by the base station apparatus, based on the capability information.

(23) In addition, an integrated circuit according to the invention is mounted on a mobile station apparatus that is connected to a base station apparatus by aggregating a plurality of cells of which frequencies are different from each other. The integrated circuit causes the mobile station apparatus to exert a function of transmitting capability information in which information related to an uplink transmission timing supported by the mobile station apparatus is associated with the plurality of frequencies supported by the mobile station apparatus, to the base station apparatus.

(24) In addition, an integrated circuit according to the invention is mounted on a base station apparatus that communicates with a mobile station apparatus by aggregating a plurality of cells of which frequencies are different from each other. The integrated circuit causes the base station apparatus to exert a function of receiving the capability information in which the information related to an uplink transmission timing supported by the mobile station apparatus is associated with the plurality of frequencies supported by the mobile station apparatus, and a function of determining whether the plurality of cells of which the uplink transmission timings are different from each other can be aggregated or not, based on the capability information.

In the present specification, the invention is disclosed with the improvement in the mobile station apparatus, the base station apparatus, the communication system, the mobile station apparatus capability notification method, and the integrated circuit in a case where the mobile station apparatus and the base station apparatus are connected to each other using a plurality of serving cells of which the frequencies are different. However, the communication system to which the invention is applicable is not limited to the communication systems that is upward-compatible to EUTRA such as the EUTRA or the advanced EUTRA.

For example, the technology described in the specification can be used in various communication systems such as a code division multiple access (CDMA) system, a time division multiple access (TDMA) system, a frequency division multiple access (FDMA) system, an orthogonal FDMA (OFDMA) system, a single carrier FDMA (SC-FDMA) system, and other systems. As used herein, the system and the network can be used synonymously.

Advantageous Effects of Invention

As described above, according to the invention, in a case where the mobile station apparatus that can be connected to the base station apparatus using a plurality of serving cells of which the frequencies are different from each other supports the transmission in the plurality of uplink transmission timings, it is possible to provide the mobile station apparatus, the base station apparatus, the communication system, the mobile station apparatus capability notification method, and the integrated circuit which enable the uplink transmission timing support information for each frequency band of the mobile station apparatus to be effectively notified to the base station apparatus.

BRIEF DESCRIPTION OF DRAWINGS

FIG. 7 is a diagram illustrating a message structure of the mobile station apparatus capability that configures the number of supported uplink transmission timings in a second embodiment of the invention.

FIG. 8 is another diagram illustrating a message structure of the mobile station apparatus capability that configures the number of the supported uplink transmission timings in the second embodiment of the invention.

FIG. 9 is a diagram illustrating a message structure of the mobile station apparatus capability that configures the number of supported uplink transmission timings in a third embodiment of the invention.

FIG. 10 is a diagram illustrating a message structure of the mobile station apparatus capability that configures the number of the supported uplink transmission timings in the third embodiment of the invention.

FIG. 15 is a diagram for describing a combination of the frequency bands for the uplink supported by the radio apparatus in the mobile station apparatus in the related art.

DESCRIPTION OF EMBODIMENTS

Figure 1:
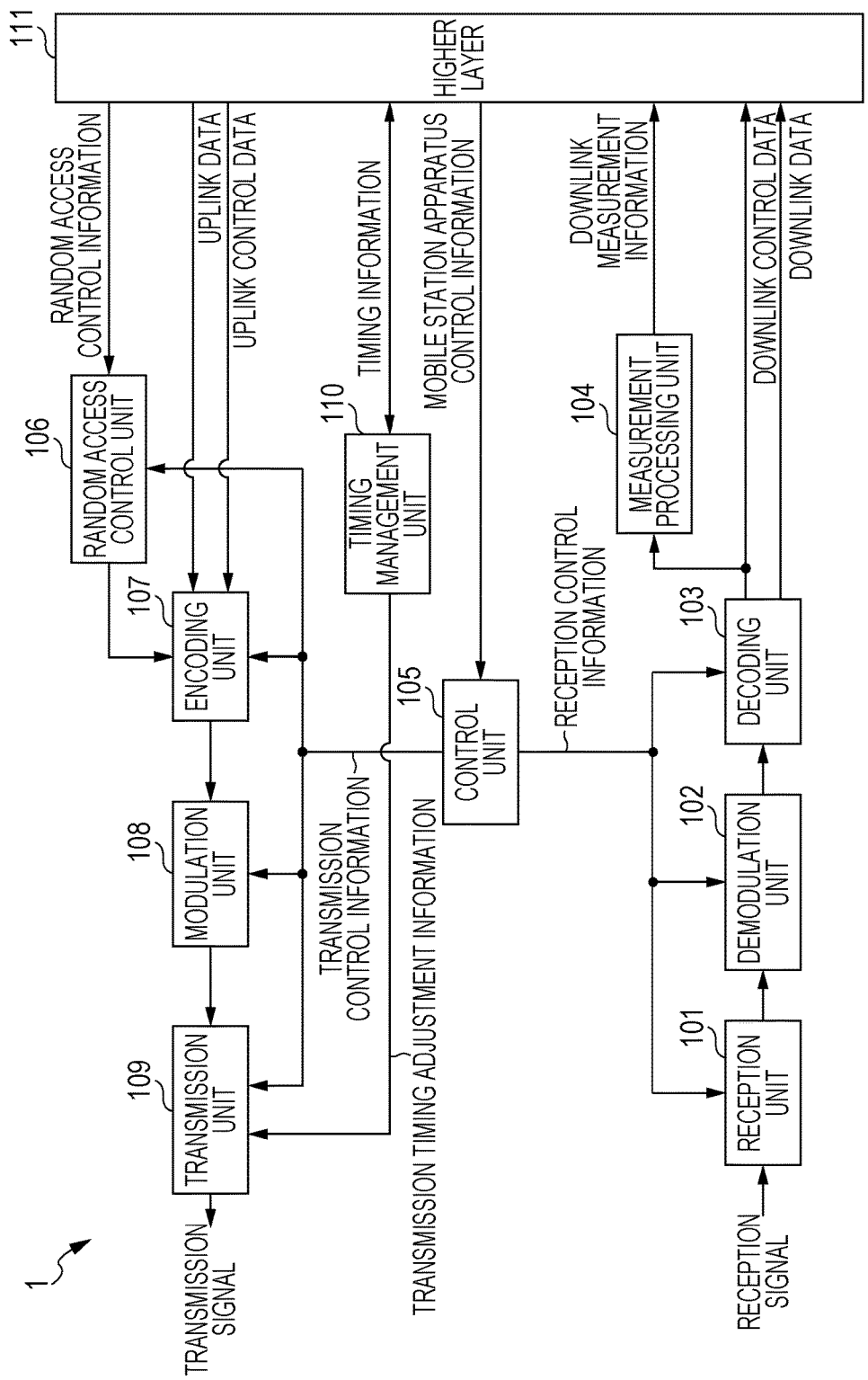
FIG. 1 is a block diagram illustrating a schematic configuration of a mobile station apparatus 1 in the invention.

Before describing the embodiments, configurations for carrier aggregation, a physical channel, a random access procedure, and a mobile station apparatus capability in the invention will be briefly described.

Carrier Aggregation

"Carrier aggregation" is a technology to aggregate frequencies (component carriers or frequency bands) having a plurality of different frequency bands and to handle the aggregated frequencies as one frequency (frequency band). For example, in a case where five component carriers having a frequency band width of 20 MHz are aggregated by carrier aggregation, the mobile station apparatus can access them as one frequency band width of 100 MHz. Here, the aggregated component carrier may have a contiguous frequency, or all or a part of the aggregated component carrier may have a non-contiguous frequency. For example, in a case where the usable frequency bands are 800 MHz band, 2.4 GHz band, and 3.4 GHz band, a certain component carrier may be transmitted in 800 MHz band, another component carrier may be transmitted in 2 GHz band, and another component carrier may be transmitted in 3.4 GHz band.

In addition, it is possible to aggregate a plurality of component carriers having contiguous or non-contiguous frequency bands, for example, in the same 2.4 GHz band. The frequency band width of each component carrier may be a frequency band width narrower than 20 MHz, or the frequency band width of each component carrier may be different. The base station apparatus can increase or decrease the number of uplink or downlink component carriers allocated to the mobile station apparatus, based on various factors such as an amount of accumulated data buffer, a reception quality in the mobile station apparatus, a load in a cell, and a QoS. Moreover, it is preferable that the number of uplink component carriers allocated (configured or added) by the base station apparatus to the mobile station apparatus is the same as or less than the number of downlink component carriers.

Physical Channel

A physical channel (or a physical signal) used in a EUTRA or in an advanced EUTRA will be described. The "channel" means a medium used for the transmission of a signal. The "physical channel" means a physical medium used for the transmission of a signal. The physical channel may be added to the EUTRA or advanced EUTRA or the structure may be changed in the future. However, in the EUTRA or advanced EUTRA, even in a case where the physical channel may be changed in the future, it may not affect the description of each embodiment in the invention.

In the EUTRA or advanced EUTRA, the mobile station apparatus and the base station apparatus manage the scheduling of the transmission and reception in the physical channel using a radio frame. One radio frame is in 10 ms. One radio frame is configured to have 10 sub-frames. Further, one sub-frame is configured to have two slots (that is, one slot is in 0.5 ms). In addition, the mobile station apparatus and the base station apparatus manage the scheduling using a resource block as a minimum unit of the scheduling in which the physical channel is arranged. The "resource block" is defined as a predetermined frequency domain in which a frequency axis consists of a set of a plurality of sub-carriers (for example, 12 sub-carriers) and a domain that consists of a predetermined transmission time interval (one slot).

Synchronization signals are configured to have 3 kinds of primary synchronization signals and a secondary synchronization signal is configured to have 31 kinds of codes alternately arranged in the frequency domain. By a signal combination of the primary synchronization signal and the secondary synchronization signal, 504 cell identifiers (cell ID: physical cell identity; PCI) that identify the base station apparatus and frame timing for the radio synchronization are indicated. The mobile station apparatus specifies the cell ID of the received synchronization signal by searching the cells.

A physical broadcast information channel (PBCH) is transmitted in order to notify a control parameter (broadcast information (system information)) which is commonly used in the mobile station apparatus in the cell. The broadcast information which is not notified by the physical broadcast information channel is transmitted by the layer 3 message (system information) through the physical downlink shared channel, and by the radio resource being notified through the physical downlink control channel. As the broadcast information, a cell global identifier (CGI) indicating an identifier of an individual cell, a tracking area identifier (TAI) that manages the waiting area by paging, and a random access control information are notified.

A downlink reference signal (downlink pilot signal, also called downlink pilot channel) is a downlink pilot signal transmitted by a predetermined electric power for each cell. In addition, the downlink reference signal is a known signal which is periodically repeated by a position in the frequency and the time, based on a predetermined rule. The mobile station apparatus measures the reception quality for each cell by receiving the downlink reference signal. In addition, the mobile station apparatus also uses the downlink reference signal as a reference signal for demodulating the physical downlink control channel or the physical downlink shared channel which are simultaneously transmitted with the downlink reference signal. A sequence used in the downlink reference signal is a sequence which can be identified for each cell. Moreover, sometimes the downlink reference signal is described as a cell-specific reference signal (cell-specific RS), but the usage and meaning thereof is the same.

The physical downlink control channel (PDCCH) is transmitted with some OFDM symbols from the beginning of each sub-frame. The physical downlink control channel is used for indicating the adjustment amount of the increase and decrease of the radio resource allocation information and/or transmission power according to the scheduling of the base station apparatus with respect to the mobile station apparatus. The mobile station apparatus monitors the physical downlink control channel for the mobile station apparatus itself before transmitting and receiving the layer 3 message (a paging, a handover command and the like) that is a downlink data and a downlink control data. The mobile station apparatus, by receiving the physical downlink control channel for the mobile station apparatus itself, needs to acquire the information in which the radio resource is assigned and which is called uplink grant at the time of transmission and downlink grant at the time of reception (down link assignment), from the physical downlink control channel. Moreover, the physical downlink control channel may also be configured so as to be transmitted with a resource block region dedicatedly assigned with respect to the mobile station apparatus from the base station apparatus in addition to being transmitted with the OFDM symbol described above.

A physical uplink control channel (PUCCH) is used (i) for performing a reception acknowledgement response (ACK/NACK: acknowledgement/negative acknowledgement) of the data transmitted with the physical downlink shared channel, (ii) for notifying the propagation path information (channel state information (CSI)) of the downlink, and (iii) for performing the scheduling request (SR) which is a request for the radio resource of the uplink. The CSI includes a channel quality indicator (CQI), a precoding matrix indicator (PMI), a precoding type indicator (PTI), and a rank indicator (RI). Each indicator is also described as indication, but the usage and the meaning are the same.

The physical downlink shared channel (PDSCH) is also used for notifying the mobile station apparatus of the broadcast information not included in the paging and the physical broadcast information channel as the layer 3 message which is a downlink control data, other than as the down link data. The radio resource allocation information of the physical downlink shared channel is indicated as the physical downlink control channel.

The physical uplink shared channel (PUSCH) mainly transmits the uplink data and the uplink control data, and also can include the control data for controlling the reception quality of the downlink and/or the ACK/NACK. In addition, the radio resource allocation information of the physical uplink shared channel is indicated as the physical downlink control channel as similar to the downlink.

An uplink reference signal (also called an uplink pilot signal, or an uplink pilot channel) is an uplink pilot signal transmitted from each mobile station apparatus. The uplink reference signal includes: a demodulation reference signal (DRS) used for performing a channel estimation at the time of demodulation of the physical uplink control channel PUCCH and/or the physical uplink shared channel PUSCH by the base station apparatus; and a sounding reference signal (SRS) mainly used for performing the estimation of the uplink channel state of each mobile station apparatus (quality of the uplink, uplink transmission timing and the like) by the base station apparatus.

A physical random access channel (PRACH) is a channel used for notifying of a preamble sequence and has a guard time. The preamble sequence is provided with 64 kinds of sequences and is configured so as to express the 6-bit information. The physical random access channel is used as a means for accessing the mobile station apparatus to the base station apparatus. The mobile station apparatus uses the physical random access channel in order to request the radio resource to the mobile station apparatus when the physical uplink control channel is not configured, and in order to request the transmission timing adjustment information (also called timing advance: TA) necessary for matching the uplink transmission timing and the reception timing window of the base station apparatus to the base station apparatus. Specifically, the mobile station apparatus transmits the preamble sequence using the radio resource for the physical random access channel configured by the base station apparatus. The mobile station apparatus that receives the transmission timing adjustment information configures the transmission timing timer (Timing Alignment timer, TA timer, TAT) which counts the effective time of the transmission timing adjustment information. The mobile station apparatus manages the state as the transmission timing adjustment state during the effective time and transmission timing non-adjustment state (a state in which the transmission timing is not adjusted) during other than the effective time. Here, since other physical channels do not relate to each embodiment of the invention, detailed description will be omitted.

Random Access Procedure

A series of procedures related to the random access is called "random access procedure." In the random access procedure, there are two procedures, one is a contention based random access procedure and the other is a non-contention based random access procedure.

The contention based random access procedure is a random access procedure in which the preamble sequences transmitted from different mobile station apparatuses have a possibility of contention. The contention based random access procedure is used for an initial access from the state in which the mobile station apparatus is not connected (communicated) to the base station apparatus, and is used for a scheduling request which requests the uplink transmission resource from the state in which the mobile station apparatus is connected to the base station apparatus. The "contention between the preamble sequences" means that a plurality of mobile station apparatuses transmits the physical random access channels having the same preamble sequences using the same frequency and the time resources. Moreover, the contention between the preamble sequences is also called a contention between the random accesses.

The non-contention based random access procedure is a random access procedure in which the preamble sequences transmitted from different mobile station apparatuses do not have a possibility of contention. The non-contention based random access procedure initiates by the instruction from the base station apparatus in the state in which the mobile station apparatus is connected to the base station apparatus and the uplink synchronization is separated. The non-contention based random access procedure is instructed to initiate by the message of a radio resource control (RRC: layer 3) and the control data of the physical downlink control channel PDCCH.

The preamble sequence (dedicated preamble) used in the non-contention based random access procedure is dedicatedly notified to the mobile station apparatus by the base station apparatus. The preamble sequence used in the contention based random access procedure randomly selects and uses one preamble sequence from the preamble sequences which are not used as the dedicated preamble, when the mobile station apparatus randomly accesses. In a certain cell, the number of preamble sequences that is used respectively in the contention based random access procedure and the non-contention based random access procedure among the preamble sequences that can be used by the mobile station apparatus is notified from the base station apparatus.

Figure 12:
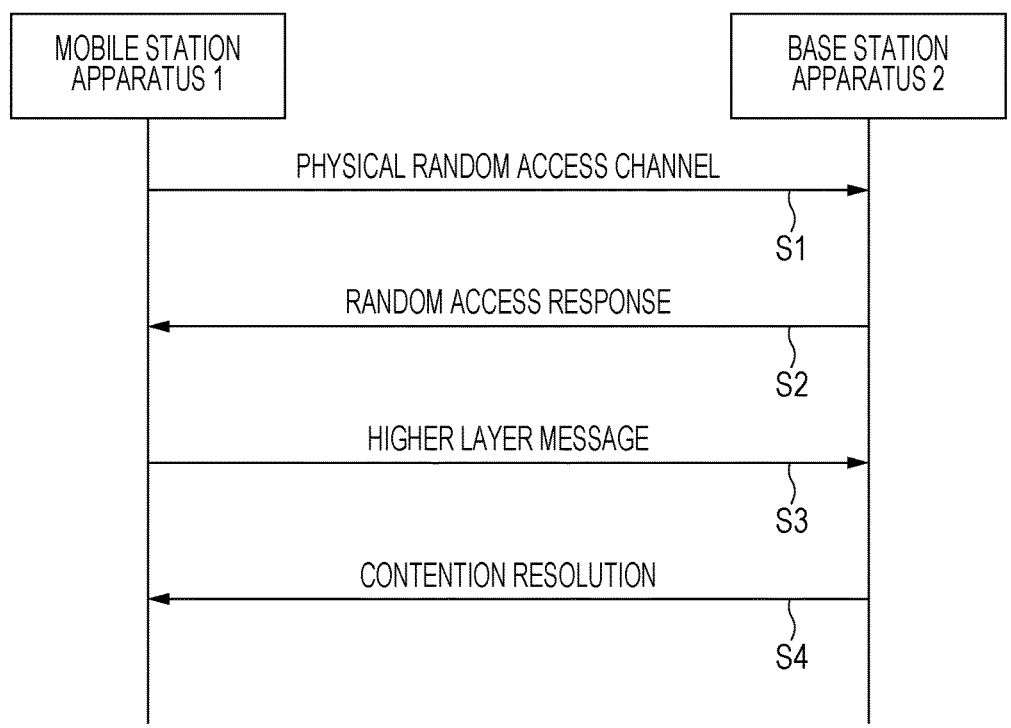
FIG. 12 is a sequence chart diagram for describing a contention based random access procedure.

The contention based random access procedure will be briefly described using FIG. 12. First, the mobile station apparatus 1 transmits the preamble sequence (random access preamble) selected based on the downlink radio propagation path loss (path loss) and/or the size of the message 3 (message transmitted in STEP S3) to the base station apparatus 2 (STEP S1). The base station apparatus 2 which receives the random access preamble calculates the amount of deviation of the transmission timing between the mobile station apparatus 1 and the base station apparatus 2 from the random access preamble. Further, the base station apparatus 2 transmits the response (random access response) with respect to the random access preamble including the transmission timing adjustment information for adjusting the deviation of the transmission timing, to the mobile station apparatus 1 (STEP S2).

The mobile station apparatus 1 checks the content of the random access response. The mobile station apparatus 1, in a case where the preamble number corresponding to the transmitted random access preamble is included in the random access response, adjusts the uplink transmission timing from the transmission timing adjustment information. The mobile station apparatus 1, in a case where the transmission timing is adjusted, causes the transmission timing timer (TA timer) to initiate, in which the adjusted transmission timing is effective. In addition, the mobile station apparatus 1 transmits the message of the higher layer (higher layer message, RRC message) to the base station apparatus 2, based on the scheduling information included in the random access response (STEP S3). The base station apparatus 2 transmits a contention confirmation message (contention resolution) to the mobile station apparatus 1 which can receive the higher layer message in STEP S3 (STEP S4), and ends the procedure.

Figures 13, 14:
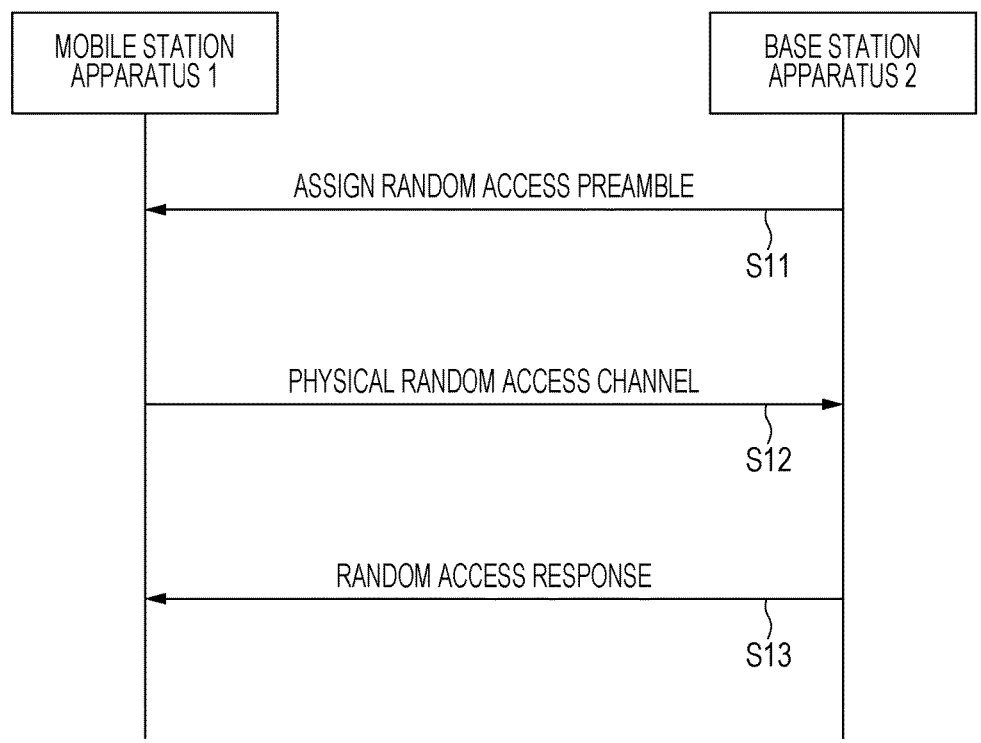
FIG. 13 is a sequence chart diagram for describing a non-contention based random access procedure.
FIG. 14 is a diagram for describing a frequency band for the uplink supported by a radio apparatus in the mobile station apparatus in the related art.

The non-contention based random access procedure will be briefly described using FIG. 13. First, the base station apparatus 2 notifies the mobile station apparatus 1 (assigns the random access preamble) of the dedicated preamble number and the physical random access channel number in use (random access channel number) (STEP S11). The "random access channel number" means a number indicating the sub-frame that admits the transmission of the physical random access channel that uses the dedicated preamble (number) notified from the base station apparatus 2 to the mobile station apparatus 1. For example, a certain random access channel number indicates that the dedicated preamble may be transmitted with the entire physical random access channel, and a certain random access channel number indicates that the dedicated preamble may be transmitted in every two physical random access channels in the time direction.

The mobile station apparatus 1 transmits the preamble sequence (dedicated preamble) corresponding to the designated preamble number with the physical random access channel in which the admission of the dedicated preamble transmission is indicated by the random access channel number (STEP S12). The base station apparatus 2 that receives the dedicated preamble calculates an amount of deviation of the transmission timing between the mobile station apparatus 1 and the base station apparatus 2, from the dedicated preamble. Further, the base station apparatus 2 transmits the response with respect to the dedicated preamble (random access response) including the transmission timing adjustment information for adjusting the deviation of the transmission timing, to the mobile station apparatus 1 (STEP S13), and ends the procedure.

However, in a case where a value of the preamble number notified from the base station apparatus 2 is a specific number (for example, zero), the mobile station apparatus 1 performs, not the non-contention based random access procedure, but the contention based random access procedure. In this case, the mobile station apparatus 1 ends the procedure according to the procedure in STEPs S1 to S4 in FIG. 12.

Configuration of Mobile Station Apparatus Capability

A configuration of the mobile station apparatus capability (a structure of the signaling and a structure of the message) when the mobile station apparatus is capable of simultaneously communicating the cell of a plurality of different frequency bands by carrier aggregation will be described.

FIG. 14 is a diagram illustrating an example of a radio apparatus (RF: radio frequency) used for the uplink transmission included in the mobile station apparatus 1, and the frequency band supported by the radio apparatus used for the uplink transmission. In each frequency band, numbers are assigned, which specifies the frequency and bandwidth of the uplink and downlink usable for the radio communications between the base station apparatus and the mobile station apparatus in the communication system. FIG. 14 illustrates that the mobile station apparatus includes two radio apparatuses (Tx RF#1 and Tx RF#2) used for the uplink transmission, and the Tx RF#1 supports the transmission in the Band#1 only, and the Tx RF#2 supports the transmission in both of the Band#1 and Band#5, and thus the transmission in both bands is possible. Hereinafter, the radio apparatus used for the uplink transmission will be suitably called as "radio apparatus for uplink" and will be used for describing.

FIG. 15 illustrates an example of combinations of the frequency bands supported by each radio apparatus for uplink of the mobile station apparatus illustrated in FIG. 14. FIG. 15 means the number of combinations (RF BandCombination#1 to RF BandCombination #4) in the radio apparatus for uplink and the frequency bands that can be combined. Here, the RF BandCombination#1 means that carrier aggregation (intra-band non-contiguous carrier aggregation) is possible, in which two or more different component carriers (frequency bands) of the Band#1 are used. In addition, the RF BandCombination#2 means that carrier aggregation (inter-band non-contiguous carrier aggregation) is possible, in which two or more frequency bands, such as the Band#1 and the Band#5 of the frequency bands are used.

In addition, the RF BandCombination#3 means that the communication using one or a plurality of frequency bands of the Band#1 is possible. In addition, the RF BandCombination#4 means that the communication using one or a plurality of frequency bands of the Band#5 is possible. Carrier aggregation for the RF band combination#3 or RF BandCombination#4 is intra-band contiguous carrier aggregation. The number of contiguous frequency bands at the time of carrier aggregation is specified by another parameter.

Figure 16:
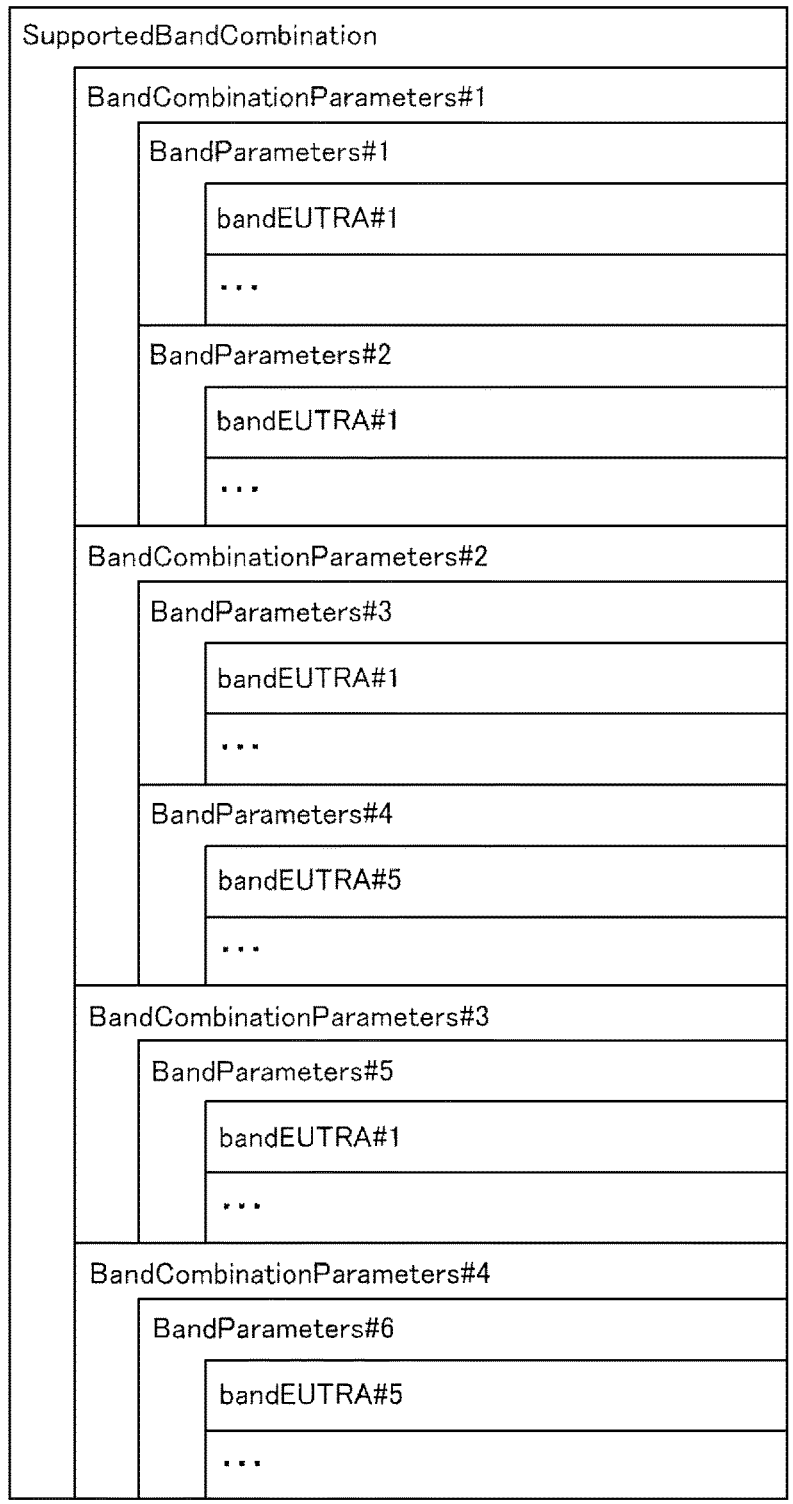
FIG. 16 is a diagram illustrating an example of a message structure of the mobile station apparatus capability that configures a combination of the frequency bands related to carrier aggregation for the mobile station apparatus in the related art.

FIG. 16 is a diagram illustrating an example of a parameter structure of the mobile station apparatus capability configured in the mobile station apparatus having the radio apparatus in FIG. 14 and FIG. 15. First, in each frequency band combination (BandCombinationParameters), a group of band parameters (BandParameters) is configured, which includes the frequency band (bandEUTRA) that is supported by each radio apparatus (Tx RF) for uplink. In the frequency band (bandEUTRA), a number for specifying the frequency and bandwidth of the uplink and downlink that can be used for radio communication between the base station apparatus and the mobile station apparatus in the communication system is configured.

In FIG. 16, the parameters other than the frequency bands are not illustrated in description. In the structure of the parameter of the mobile station apparatus capability, as a parameter other than the frequency bands, for example, information on the number of contiguous frequency bands that can be aggregated at the time of carrier aggregation and the number of layers of the multi input multi output (MIMO) of uplink and downlink at the time of communication by the combination of the frequency bands, is configured. Moreover, the number of contiguous frequency bands that can be aggregated at the time of carrier aggregation may be provided as a value which is coded as support class information of carrier aggregation. Then, all of the combinations of the frequency bands are listed as one frequency (SupportedBandCombination), and the SupportedBandCombination is configured as the mobile station apparatus capability.

In other words, a set of frequency bands which can be supported by the mobile station apparatus (bandEUTRA) and parameters associated with the frequency bands is the group of band parameters (BandParameters). In addition, a combination of a group of band parameters (BandParameters) supported by the mobile station apparatus is a combination of the frequency bands (BandCombinationParameters). In addition, a list of combinations of frequency bands (BandCombinationParameters) supported by the mobile station apparatus is the "SupportedBandCombination".

The configuration of the mobile station apparatus capability illustrated in FIG. 16 will be described in detail. The BandCombinationParameters#1 includes the BandParameters#1 and BandParameters#2. The BandParameters#1 includes at least bandEUTRA#1, and the BandParameters#2 includes at least bandEUTRA#1. By configuring the mobile station apparatus capability in this way, when the frequency band of the Band#1 is received (transmitted), the mobile station apparatus can notify the base station apparatus that it has a radio apparatus configuration capable of supporting the reception (transmission) of another frequency band of the Band#1 (that is, in the Band#1, intra-band non-contiguous carrier aggregation is possible).

In addition, the BandCombinationParameters#2 includes the BandParameters#3 and BandParameters#4. The BandParameters#3 includes at least bandEUTRA#1, and the BandParameters#4 includes at least bandEUTRA#5. By configuring the mobile station apparatus capability in this way, when the frequency band of the Band#1 is received (transmitted), the mobile station apparatus can notify the base station apparatus that it has a radio apparatus configuration capable of supporting the reception (transmission) of another frequency band of the Band#5 (that is, inter-band non-contiguous carrier aggregation using the Band#1 and the Band#5 is possible).

In addition, the BandCombinationParameters#3 includes the BandParameters#5. The BandParameters#5 includes at least bandEUTRA#1. In this case, by configuring the number of contiguous frequency bands that can be aggregated in the BandParameters#5 to 1, the capability in a case where carrier aggregation is not performed can be notified to the base station apparatus. By configuring the number of contiguous frequency bands that can be aggregated in the BandParameters#5 to 2 or more, the configuration can be made such that the capability at the time of intra-band contiguous carrier aggregation is notified to the base station apparatus. In the BandCombinationParameters#4 also, the mobile station apparatus capability can be notified to the base station apparatus by the same method of parameter designation as in the BandCombinationParameters#3.

The mobile station apparatus, in a case where the BandCombinationParameters is different even though the frequency band (bandEUTRA) is the same, may configure a different value from that of associated parameters based on the radio apparatus configuration of the mobile station apparatus itself. That is, even though the supporting frequency band (bandEUTRA) is the same, other parameters of the group of parameters (BandParameters) may be configured to a different value. For example, in the BandParameters#1, it is possible to configure the frequency band to bandEUTRA#1, the number of the contiguous frequency bands that can be aggregated to 2, and the number of MIMO layers to 2, and in the BandParameters#3, it is also possible to configure the frequency band to bandEUTRA#1, the number of contiguous frequency bands that can be aggregated to 1, and the number of MIMO layers to 4.

Typically, these parameters are not dynamically changed during the communication. For this reason, the mobile station apparatus configures the mobile station apparatus capability based on the mobile station apparatus capability information as a non-volatile memory which is statically configured as the system parameter inside the mobile station apparatus. The mobile station apparatus, when connected to the base station apparatus, or according to the request from the base station apparatus, transmits the mobile station apparatus capability message which includes the mobile station apparatus capability, to the base station apparatus as the RRC message.

The base station apparatus receives the mobile station apparatus capability message, and appropriately configures the component carriers (cells) that can be supported by the radio apparatus configuration of the mobile station apparatus based on the notified mobile station apparatus capability at the time of carrier aggregation, and becomes capable of performing the communication with the mobile station apparatus.

Example of Communication Network Configuration in the Invention

Figure 17:
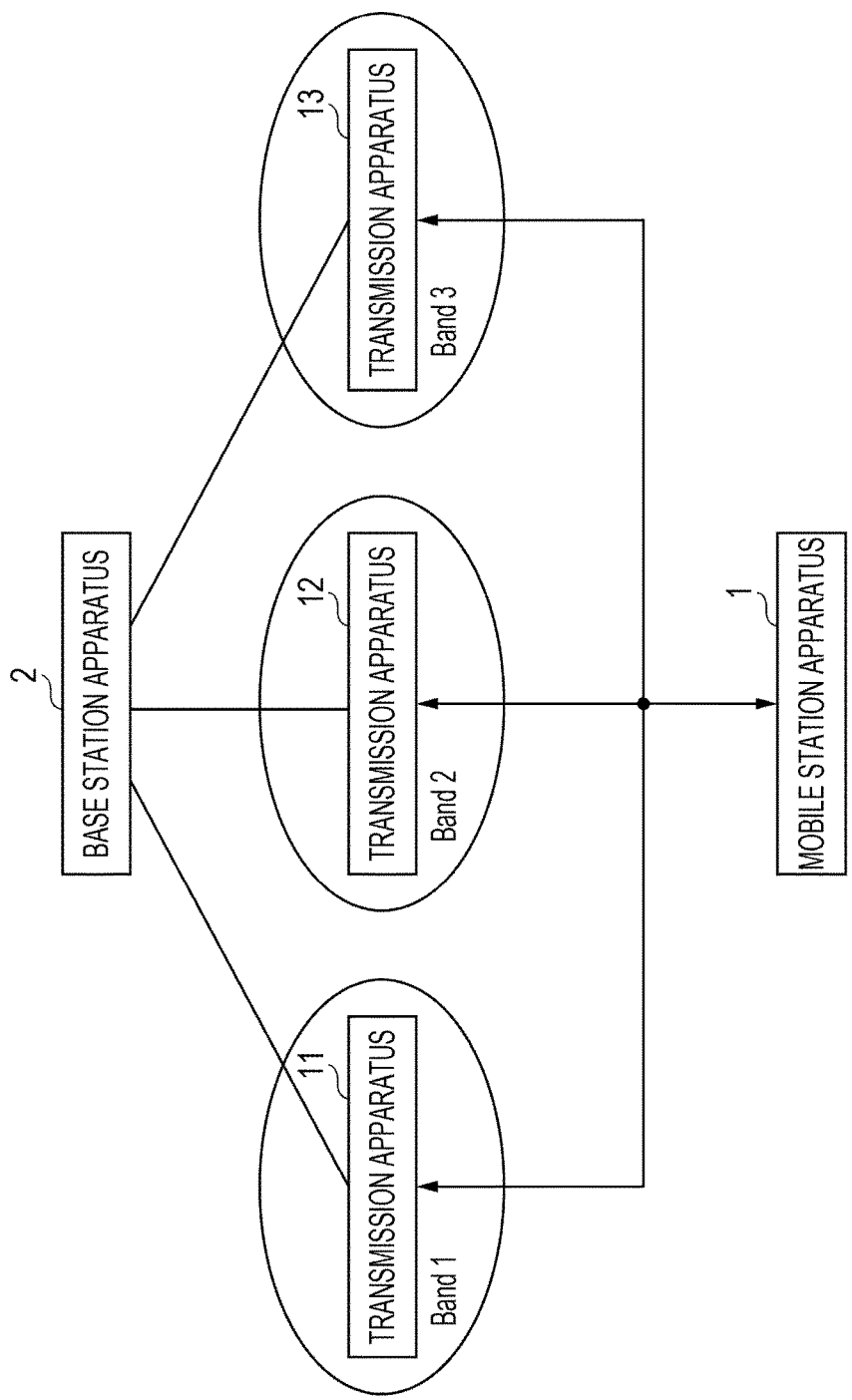
FIG. 17 is a diagram illustrating an example of a communication network configuration in the embodiment of the invention.

FIG. 17 is a diagram illustrating an example of a communication network configuration in the embodiment of the present invention. In a case where the mobile station apparatus 1 can be wirelessly connected to the base station apparatus 2 by simultaneously using the frequency bands of a plurality of frequencies (component carriers, Band1 to Band3) by carrier aggregation, as a communication network configuration, a certain one base station apparatus 2 includes a plurality of transmission apparatuses 11 to 13 (and transmission apparatuses 21 to 23 which are not illustrated) for each of the plurality of frequencies. Therefore, the configuration in which one base station apparatus 2 can perform the control of each frequency is preferable from the view point of the simplification of the control. The configuration of the base station apparatus 2 is not limited to that illustrated in FIG. 17. However, the base station apparatus 2 may be configured in such a manner that one base station apparatus 2 performs the transmission of the plurality of frequencies by one transmission apparatus under such a reason as the plurality of frequencies are contiguous frequencies. Further, the base station apparatus 2 may be configured in such a manner that the transmission and reception timing of each frequency is different. The number of transmission apparatuses and reception apparatuses and/or the number of receivable or transmittable frequencies may different from those in the configuration in FIG. 17. The communication possible range of each frequency controlled by the transmission apparatuses of base station apparatus 2 is regarded as cells. In this case, the areas (cells) covered by each of the frequencies may have different widths or different shapes.

However, in the below-described description, the description will be made by calling the areas covered by the frequencies of the component carriers configured by the base station apparatus 2 as cells. However, it should be noted that there is a possibility that the cell here may be different from the definition of a cell in the communication system under operations in practice. For example, in a certain communication system, a part of the component carriers used for carrier aggregation may be defined merely as an additional radio resource rather than a cell. In addition, it may be defined as an enhanced cell which is different from the cell in the related art. Even in the case, in which the cell here may be different from the definition of a cell in the communication system under operations in practice by calling the component carriers in the invention as cells, the main scope of the invention will not be affected. Moreover, carrier aggregation is a communication by a plurality of cells (cells in the plurality of frequencies) in the plurality of component carriers, and thus, it is also called "cell aggregation". Moreover, the mobile station apparatus 1 may be wirelessly connected to the base station apparatus 2 in the uplink, downlink, or both of the links via a relay station apparatus (or a repeater) for each frequency. That is, base station apparatus 2 in the invention can be replaced with the relay station apparatus.

Moreover, the third generation base station apparatus 2 in the provisions of 3GPP is called "nodeB". The base station apparatus in the EUTRA and advanced EUTRA is called "eNodeB". The third generation mobile station apparatus 1 in the provisions of 3GPP is called "UE (User Equipment)". The base station apparatus 2 manages the cell that is an area with which the mobile station apparatus 1 can communicate. The cells are also called "macro cell", "femto cell", "pico cell", or "nano cell" according to the area size in which the mobile station apparatus 1 communicates. In addition, when the mobile station apparatus 1 can communicate with a certain base station apparatus 2, among the cells of the base station apparatus 2, the cell used for the communication with the mobile station apparatus 1 is called "serving cell", and the other cells are called "neighboring cell". In other words, in a case where the mobile station apparatus 1 and the base station apparatus 2 communicate using the plurality of cells by carrier aggregation, there exist the same number of serving cells as the number of component carriers configured in the mobile station apparatus 1.

Example of Configuring the Component Carrier Configuration

Figure 18:
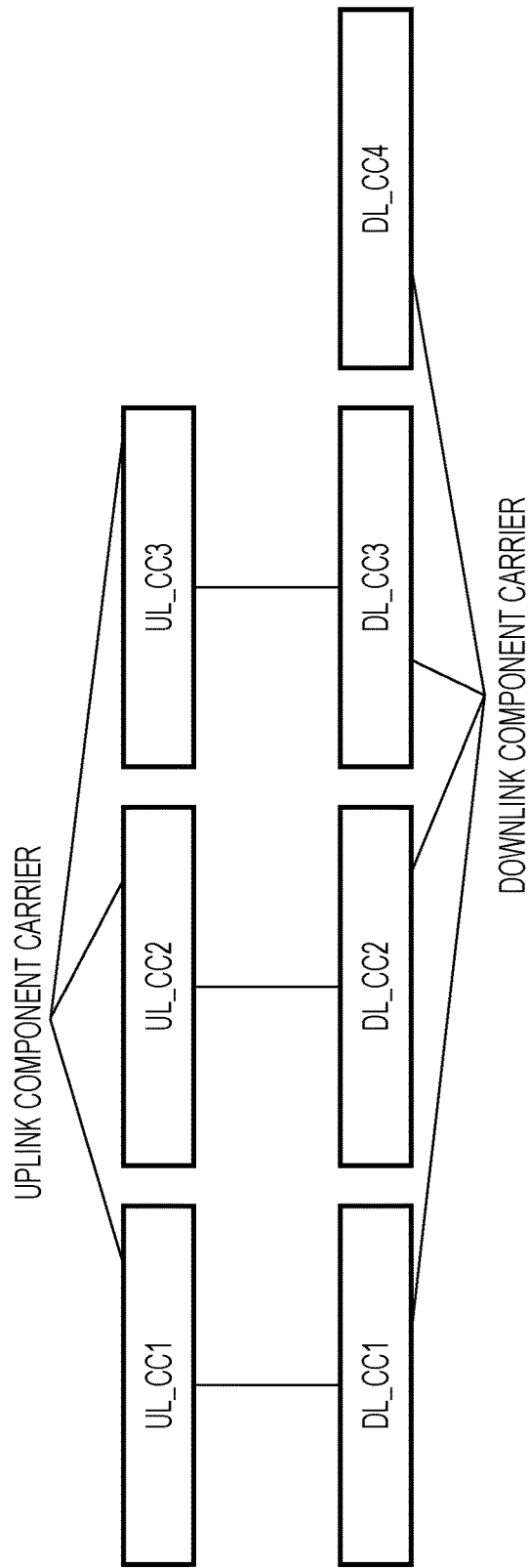
FIG. 18 is a diagram illustrating an example of configuration of a component carrier with respect to the mobile station apparatus in the embodiment of the invention.

FIG. 18 is a diagram illustrating an example of a correspondence relationship between the downlink component carrier and uplink component carrier that are configured by the base station apparatus 2 with respect to the mobile station apparatus 1 in a case where the mobile station apparatus 1 in the embodiment of the invention performs carrier aggregation. In FIG. 18, the correspondence relationship between four downlink component carriers (downlink component carrier DL_CC1 to DL_CC4) and three uplink component carriers (uplink component carrier UL_CC1 to UL_CC3) is illustrated. However, the invention is not limited to the example of configuration of the component carriers illustrated in FIG. 18.

In FIG. 18, the downlink component carrier DL_CC1 and the uplink component carrier UL_CC1, the downlink component carrier DL_CC2 and the uplink component carrier UL_CC2, and again the downlink component carrier DL_CC3 and the uplink component carrier UL_CC3 are in the cell-specific linkage (cell-specific linkage). In addition, the component carrier can be configured only with the downlink component carrier as the DL_CC4 for carrier aggregation without the uplink component carrier (without the cell-specific linkage).

The cell-specific linkage is a correspondence relationship (collaboration relationship, link information) between the component carriers of uplink and downlink. The correspondence relationship of the cell-specific linkage is typically notified as a part of the broadcast information (SIB2: system information block type 2). The cell-specific linkage is also called "SIB2 linkage". In the cell-specific linkage; (i) the configuration of the specific-linkage is explicitly notified as a part of the broadcast information, or (ii) in a case where the component carriers are added in carrier aggregation, the configuration of the correspondence relationship is notified as the RRC message (layer 3 message), or (iii) the configuration is implicitly notified by using the information on the correspondence relationship of a uniquely determined provisions on the uplink and downlink in a case where there is no explicit instruction. In a case where the RRC message is used, the base station apparatus 2 may notify the information on the cell-specific linkage that is different from the uplink component carrier indicated as the broadcast information of the downlink component carrier configured, to the mobile station apparatus 1.

On the other hand, the base station apparatus 2 can also dedicatedly configure (UE specific linkage) the correspondence relationships between the downlink component carrier and the uplink component carrier for each mobile station apparatus 1 separate from the cell-specific linkage. In this case, the configuration of the UE specific linkage is indicated as the RRC message (layer 3 message). The base station apparatus 2 can also assign a plurality of configuration necessary for transmission of the physical random access channel for each uplink component carrier or for each uplink frequency.

Typically, the cell-specific linkage is used for indicating the correspondence relationship of the uplink and downlink frequencies used in the communication between the mobile station apparatus 1 and the base station apparatus 2, in a case where the mobile station apparatus 1 does not perform carrier aggregation. In addition, the cell-specific linkage is used for indicating the correspondence relationship of the uplink and downlink component carriers to which the allocation of the radio resource notified by the physical downlink control channel at the time of carrier aggregation is applied.

When the path-loss used for transmission power control of the uplink component carrier of the mobile station apparatus 1 is calculated, the UE specific linkage is typically used for indicating the quality of downlink component carrier on which the calculation is based.

The cell that is configured with the uplink component carrier to which the configuration of the uplink control channel for requesting the radio resource and the downlink component carrier to which the uplink component carrier is linked as the cell-specific linkage is called "primary cell (PCell)". In addition, the cell configured with the component carrier other than the primary cell is called "secondary cell (SCell). The primary cell is outside the scope of the activation/deactivation control (that is, it is considered to be always activated). The secondary cell has states of the activation/deactivation. Those states, in addition to the explicit designation from the base station apparatus 2, are changed based on the timer configured in the mobile station apparatus 1 for each component carrier. The primary cell and the secondary cell are called together "serving cell".

Here, the activation or the deactivation of the component carrier (that is, the activation or the deactivation of the secondary cell) is configured so as to be controlled by the L2 (layer 2) message which can be analyzed by the layer 2 configuration task. That is, the activation or the deactivation is controlled by a control command recognized by the layer 2 after the decoding in the physical layer (layer 1). Moreover, the L2 message in the EUTRA and the advanced EUTRA is notified by the control command (MAC control element) which is analyzed in the MAC layer.

The mobile station apparatus 1 may stop the monitoring of an uplink grant and a downlink grant (downlink assignment) used for the scheduling of the deactivated component carrier (secondary cell). That is, the mobile station apparatus 1 may stop the monitoring of the physical downlink control channel. In addition, the mobile station apparatus 1, regarding the uplink of the deactivated component carrier (secondary cell), may stop the transmission of the uplink pilot channel which is called sounding reference signal (SRS). In addition, the mobile station apparatus 1, regarding the uplink of the deactivated component carrier (secondary cell), may stop the transmission of the physical uplink control channel. In addition, the mobile station apparatus 1, regarding the downlink of the deactivated component carrier (secondary cell), may implement the measuring by a sampling rate lower than that in the activated state.

Hereinafter, considering the matters described above, the preferable embodiments of the invention will be described in detail with reference to the drawings. However, in the description of the invention, in a case where the detailed description of the well-known function or configuration related to the invention is considered to make the scope of the invention obscure, the detailed description thereof will be omitted.

First Embodiment

The first embodiment of the invention will be described as below. The embodiment relates to a mobile station apparatus capability notification method at the time of carrier aggregation for a mobile station apparatus 1, particularly relates to the mobile station apparatus capability notification method in a case where the mobile station apparatus 1 manages a plurality of uplink transmission timings.

FIG. 1 is a block diagram illustrating an example of the mobile station apparatus 1 according to the embodiment of the invention. The mobile station apparatus 1 is configured to include a reception unit 101, a demodulation unit 102, a decoding unit 103, a measurement processing unit 104, a control unit 105, a random access control unit 106, an encoding unit 107, a modulation unit 108, a transmission unit 109, a timing management unit 110, and a higher layer 111. The higher layer 111 includes a radio resource control (RRC) layer that performs a radio resource control. In addition, the random access control unit 106 and the timing management unit 110 functions as a part of a medium access control (MAC) layer that manages a data link layer. Moreover, the mobile station apparatus 1 may include a plurality of blocks of the reception systems (the reception unit 101, the demodulation unit 102, and the decoding unit 103) and a plurality of blocks of the transmission system (the encoding unit 107, the modulation unit 108, and the transmission unit 109), for supporting the plurality of frequencies (frequency bands, frequency bandwidths).

Mobile station apparatus control information related to the reception is input to the control unit 105 from the higher layer 111. The control information related to the reception is appropriately input to the reception unit 101, the demodulation unit 102, and the decoding unit 103 as reception control information. The mobile station apparatus control information configured with the reception control information and the transmission control information is information necessary for radio communication control of the mobile station apparatus 1. The mobile station apparatus control information is configured by the base station apparatus 2 and the system parameter, and is input to the control unit 105 by the higher layer 111 according to the necessity. In addition, the reception control information includes information such as a reception timing related to each channel, a method of multiplexing, information on the arrangement of the radio resource in addition to the information on receiving frequency band.

A reception signal is received by the reception unit 101. The reception unit 101 receives a signal in the frequency band designated by the reception control information. The received signal is input to the demodulation unit 102. The demodulation unit 102 performs the demodulation of the received signal, and inputs the signal to the decoding unit 103. The decoding unit 103 correctly decodes the downlink data and the downlink control data and inputs each decoded data to the higher layer 111. The measurement processing unit 104 generates the downlink measurement information based on the measurement result of the reception quality (SIR, SINR, RSRP, RSRQ, RSSI, path loss and the like) of the downlink reference signal and the measurement result of the reception error rate of the physical downlink control channel and the physical downlink shared channel for each cell (component carrier), and outputs the downlink measurement information to the higher layer 111. The downlink measurement information, in the higher layer 111, is used for detecting the radio link failure accompanied by a radio link re-establishment and for executing the radio link monitoring accompanied by a stop of the uplink transmission.

In addition, the mobile station apparatus control information related to the transmission is input to the control unit 105 from the higher layer 111. The control information related to the transmission is appropriately input to the random access control unit 106, the encoding unit 107, the modulation unit 108, and the transmission unit 109 as the transmission control information. The transmission control information includes encoding information, modulation information, transmission frequency band information, transmission timing related to each channel, a method of multiplexing, information on the arrangement of the radio resource, as uplink scheduling information of the transmission signal. Random access control information is input to the random access control unit 106 from the higher layer 111. In the random access control information, preamble information, radio resource information used for the transmission of the physical random access channel, and the like are included. The higher layer 111 configures transmission timing adjustment information used for adjusting the uplink transmission timing according to the necessity and a transmission timer in the timing management unit 110. The timing management unit 110 manages the state of the uplink transmission timing (a state of transmission timing adjusted or a state of transmission timing non-adjusted) based on the configured information.

In a case where it is necessary to manage a plurality of the states of the uplink transmission timing, the higher layer 111 configures the random access control information that corresponds to the plurality of uplink transmission timings respectively, in the random access control unit 106. Similarly, in a case where it is necessary to manage a plurality of the states of the uplink transmission timing, the higher layer 111 configures the transmission timing adjustment information that corresponds to the plurality of uplink transmission timings respectively, in the timing management unit 110. In this case, the higher layer 111, if it is necessary to manage the timer for each uplink transmission timing, further configures a transmission timing timer that corresponds to the uplink transmission timing respectively.

To the encoding unit 107, the uplink data and the uplink control data are input from the higher layer 111, and random access data information related to the transmission of the physical random access channel is input from the random access control unit 106. The encoding unit 107 generates a preamble sequence that is transmitted as the physical random access channel based on the random access data information. In addition, the encoding unit 107 appropriately encodes each data and outputs to the modulation unit 108 according to the transmission control information.

The modulation unit 108 modulates the output from the encoding unit 107. The transmission unit 109 performs mapping the output of the modulation unit 108 to a frequency domain, and converts a frequency domain signal to a time domain signal, and amplifies the electric power by putting the signal onto a carrier wave having a predetermined frequency. The transmission unit 109 further adjusts and transmits the uplink transmission timing according to the transmission timing adjustment information input from the timing management unit 110. The physical uplink shared channel in which the uplink control data is arranged typically configures the layer 3 message (the radio resource control message; RRC message). In FIG. 1, since the other configuration elements of the mobile station apparatus 1 do not relate to the embodiment, the description will be omitted.

Figure 2:
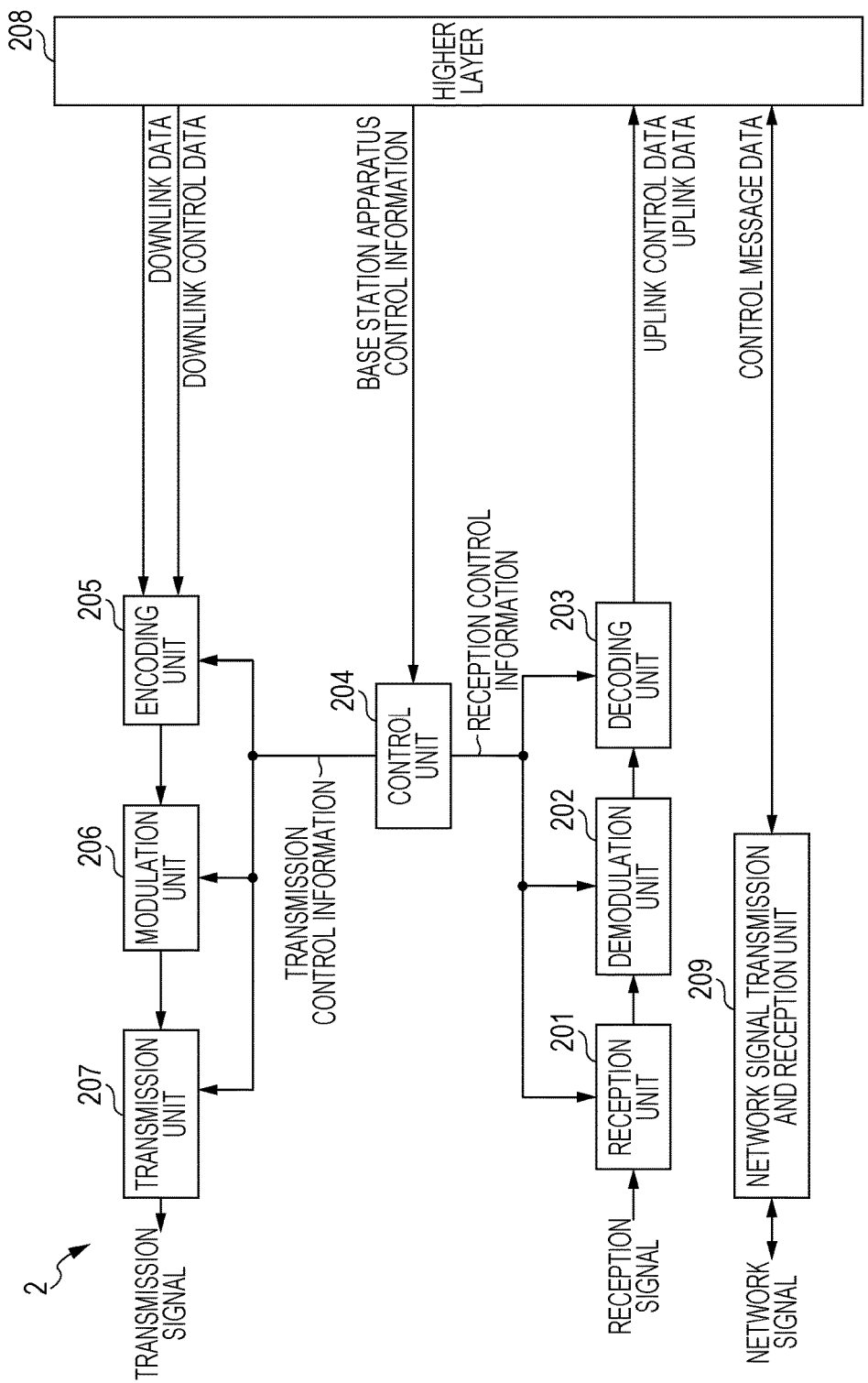
FIG. 2 is a block diagram illustrating a schematic configuration of a base station apparatus 2 in the invention.

FIG. 2 is a block diagram illustrating an example of the base station apparatus 2 according to a first embodiment of the invention. The base station apparatus is configured to include a reception unit 201, a demodulation unit 202, a decoding unit 203, a control unit 204, an encoding unit 205, a modulation unit 206, a transmission unit 207, a higher layer 208, and the network signal transmission and reception unit 209. Moreover, the base station apparatus 2 may include a plurality of blocks of the reception systems (the reception unit 201, the demodulation unit 202, and the decoding unit 203) and a plurality of blocks of the transmission systems (the encoding unit 205, the modulation unit 206, and the transmission unit 207) for supporting the plurality of frequencies (frequency bands, frequency bandwidths).

The higher layer 208 inputs the downlink data and the downlink control data to the encoding unit 205. The encoding unit 205 encodes the input data and input the encoded data to the modulation unit 206. The modulation unit 206 performs the modulation of the encoded signal. In addition, the signal input from the modulation unit 206 is input to the transmission unit 207. The transmission unit 207 performs mapping of the input signal to a frequency domain, and converts a frequency domain signal to a time domain signal, and performs the electric power amplification by putting the signal onto a carrier wave having a predetermined frequency to transmit the amplified electric power. The downlink shared channel in which the downlink control data is arranged typically configures the layer 3 message (RRC message).

In addition, the reception unit 201 converts the signal received from the mobile station apparatus 1 to a digital signal in the baseband. The digital signal is input to the demodulation unit 202 to be demodulated. The signal demodulated in the demodulation unit 202 is input to the decoding unit 203 to be decoded subsequently. The decoding unit 203 outputs the correctly decoded uplink control data and uplink data to the higher layer 208. The base station apparatus control information necessary for controlling these blocks is information which is configured with the reception control information and the transmission control information and necessary for the radio communication control of the base station apparatus 2. The base station apparatus control information is configured by the network apparatus (MME and gateway apparatus) and the system parameter of higher level. The higher layer 208 inputs the base station apparatus control information to the control unit 204. The control unit 204 appropriately inputs the base station apparatus control information related to the transmission, to each block of the encoding unit 205, the modulation unit 206, and the transmission unit 207 as the transmission control information. The control unit 204 appropriately inputs the base station apparatus control information related to the reception, to each block of the reception unit 201, the demodulation unit 202, and the decoding unit 203 as the reception control information. The RRC of the base station apparatus 2 exists as a part of the higher layer 208.

On the other hand, the network signal transmission and reception unit 209 performs the transmission (transfer) or reception of the control message or user data between the base station apparatuses 2 or between the high level network apparatus and the base station apparatus 2. In FIG. 2, since the other configuration elements of the base station apparatus 2 do not relate to the embodiment, the description will be omitted.

In addition, the network configuration of the communication system in which the mobile station apparatus 1 and the base station apparatus 2 are arranged can apply a similar configuration illustrated in FIG. 17.

Figure 3:
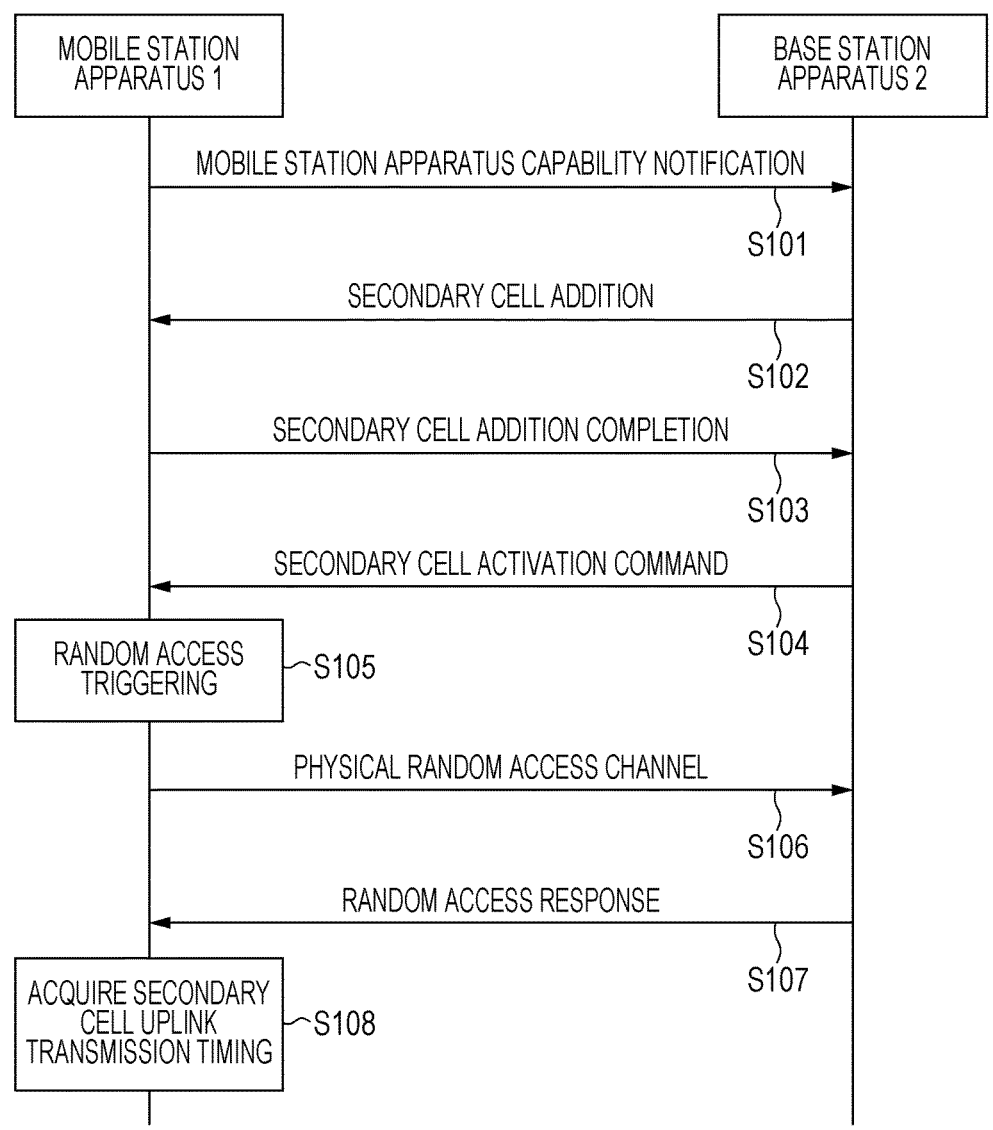
FIG. 3 is a sequence chart diagram for describing a random access procedure in the invention.

FIG. 3 is a sequence chart diagram illustrating an interaction of the control signals related to the secondary cell between the mobile station apparatus 1 and the base station apparatus 2 in the embodiment. The mobile station apparatus 1 in the sequence chart diagram initiates the operation from the state of being connected to the base station apparatus 2 via the primary cell. In addition, it should be noted that the secondary cell added in the sequence chart is the secondary cell which requires the uplink transmission timing different from that of the primary cell.

In STEP S101, the mobile station apparatus 1, after being connected to the base station apparatus 2 via the primary cell, transmits the mobile station apparatus capability notification message (UE capability) to the base station apparatus 2 by the RRC message. The mobile station apparatus capability notification message at least configures: (i) radio parameters (RF parameters), such as a parameter related to the physical layer such as the number of antennae of the mobile station apparatus 1, a transmittable and receivable frequency band in the EUTRA (bandEUTRA), a random access capability, a capability of MIMO, and a combination of the frequency bands that can be aggregated (SupportedBandCombination); and (ii) measurement parameters that indicates the frequency band which can be measured without a measurement gap. The base station apparatus 2 can configure an appropriate communication resource with respect to the mobile station apparatus 1 based on the content of the mobile station apparatus capability notification message, and can configure a measurement configuration.

In a case where it is determined that carrier aggregation using the secondary cell having a transmission timing different from that of the primary cell is possible and necessary, based on the mobile station apparatus capability notification message of the mobile station apparatus 1, the base station apparatus 2 transmits a message (secondary cell addition message) that instructs to add the secondary cell with respect to the mobile station apparatus 1 (STEP S102). When the secondary cell is added, the base station apparatus 2 may configure a group identifiers for indicating that the cell (or a group of cells) has a different uplink transmission timing. The secondary cell is added to the mobile station apparatus 1 and after the adding is completed, the mobile station apparatus 1 transmits a message (secondary cell addition completion message) to the base station apparatus 2 indicating the completion of correct execution of the instruction from the base station apparatus 2 (STEP S103). In this case, in the secondary cell add message, information configuring the secondary cell (cell ID, frequency, frequency bandwidth, physical channel information, and the like) and information (configuration of the random access, configuration of the physical random access channel, the group identifier, the TA timer, and the like) related to the random access of the uplink of the cell (or the group of the cells), are configured. In addition, a secondary cell state immediately after the addition is a non-adjustment state of the transmission timing.

After that, an activation command (a secondary cell activation) is notified from the base station apparatus 2 with respect to the secondary cell which is added in STEP S102 and in the non-adjustment state of the transmission timing (STEP S104). The activation command may be notified to the mobile station apparatus 1 by the MAC control element in the related art, or using the RRC message and the physical downlink control channel. The mobile station apparatus 1 that receives the activation command activates the secondary cell.

The mobile station apparatus 1 begins to determine whether or not to initiate the random access procedure in the activated secondary cell (STEP S105) from the random access triggering. Examples of methods of initiating the times the random access procedure by the mobile station apparatus 1 occur include: (i) at the same when the activation of the secondary cell occurs, (ii) when the random access procedure by MAC control element is instructed to initiate after the activation of the secondary cell, (iii) when the random access procedure by the physical downlink control channel PDCCH is instructed to initiate after the activation of the secondary cell, or (iv) when the random access procedure by the layer 3 message (RRC message) is instructed to initiate after the activation of the secondary cell. However, in the embodiment, any of the above described methods or the other methods may be used.

In a case where the random access triggering is detected, mobile station apparatus 1 initiates the random access procedure with respect to the secondary cell in the non-adjustment state of the transmission timing, and transmits the physical random access channel with respect to the base station apparatus 2 (STEP S106). After transmitting the physical random access channel, the base station apparatus 2 transmits a random access response with respect to the mobile station apparatus 1 in STEP S107. The details of STEP S106 and STEP S107 may be the same as in FIG. 12 or FIG. 13. That is, the mobile station apparatus 1 initiates to perform any of the contention based random access procedure or the non-contention based random access procedure as the random access procedure based on the instruction from the base station apparatus 2.

Then, after receiving the random access response in STEP S107, in the acquisition of the secondary cell uplink transmission timing (STEP S108), the mobile station apparatus 1 acquires the uplink transmission timing adjustment information of the secondary cell. The uplink transmission timing is adjusted after a predetermined time (for example, after six frames) from the time of acquiring the transmission timing adjustment information.

As each of the control messages in FIG. 3, the RRC messages in the EUTRA may be reused. For example, the mobile station apparatus capability notification message may be reused by adding necessary parameters to the UE capability information message; the secondary cell add message may be reused by adding necessary parameters to the RRC connection reconfiguration message; the secondary cell add completion message may be reused by adding necessary parameters to the RRC connection reconfiguration complete message.

Figure 4:
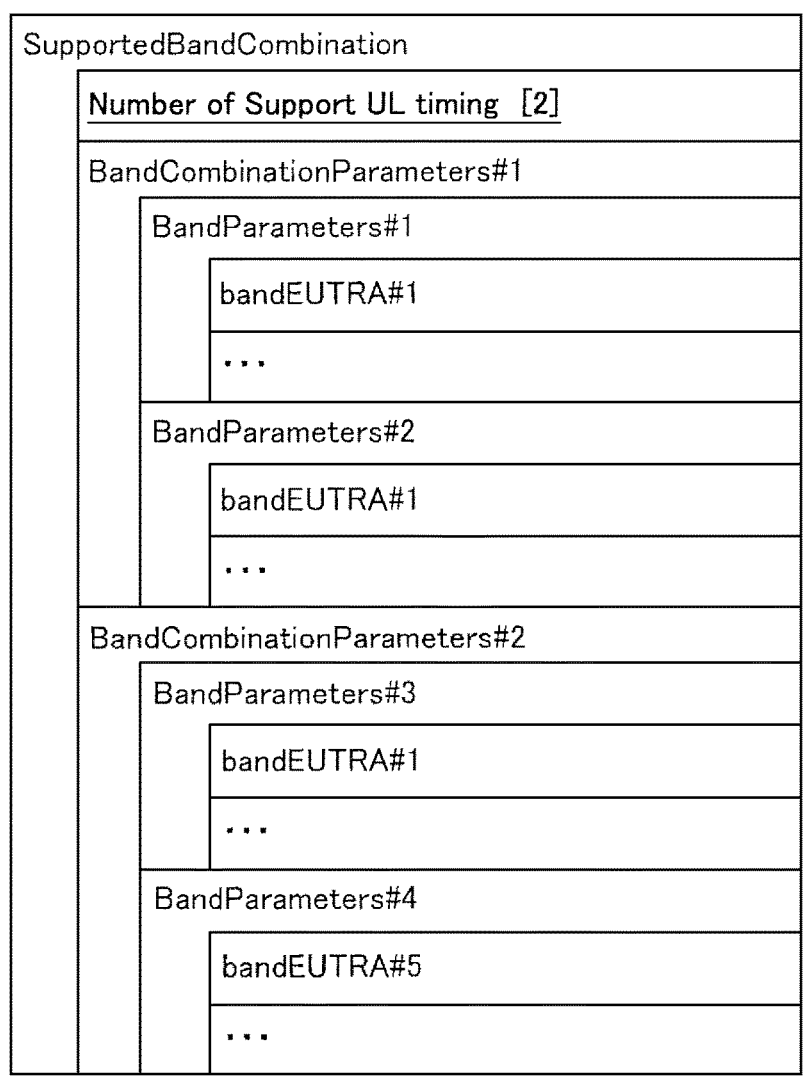
FIG. 4 is a diagram illustrating a message structure of a mobile station apparatus capability that configures the number of supported uplink transmission timings in a first embodiment of the invention.

FIG. 4 is a diagram illustrating an example of a correspondence relationship between the frequency band and the combination of the frequency bands supported by the mobile station apparatus 1 and the capability information on the uplink transmission timing, in the mobile station apparatus capability notification message that is used as a determination criteria whether or not the base station apparatus 2 can add the secondary cell having the transmission timing of uplink different from that of primary cell with respect to the mobile station apparatus 1.

In FIG. 4, as a parameter indicating the maximum number of uplink transmission timing supported by the mobile station apparatus 1, the number of uplink transmission timing support (number of support UL timing) is included in the structure of the mobile station apparatus capability message. The number of uplink transmission timing support is designated as integers equal to or larger than 1 (1, 2, 3, . . . ). Moreover, the mobile station apparatus 1 may implicitly notify the base station apparatus 2 that the number of uplink transmission timing support is one by omitting the configuration of the parameter. In this case, it is preferable that the number of uplink transmission timing support is designated as integers equal to or larger than two (2, 3, . . . ).

The number of uplink transmission timing support (number of support UL timing) is applied to the combinations of frequency bands (BandCombinationParameters) that can be aggregated in all of uplink. That is, in a case where the number of uplink transmission timing support (number of support UL timing) indicates two, and in a case where the combinations of frequency bands (SupportedBandCombination) that can be aggregated in the uplink are four, it means that the number of uplink transmission timing support is two in all of the four combinations.

FIG. 4 illustrates the configuration of the mobile station apparatus capability in a case where the number of uplink transmission timing support (number of support UL timing) indicates two, and in a case where the combinations of frequency bands (BandCombinationParameters) that can be aggregated in the uplink are two.

The base station apparatus 2 can determine the uplink transmission timing that can be configured with respect to all of the combinations of frequency bands (BandCombinationParameters) that is supported by the mobile station apparatus 1, based on the mobile station apparatus capability message configured as illustrated in FIG. 4. Moreover, the fact that the uplink transmission timing can be determined means that the secondary cell that cannot be supported (communicated) by the mobile station apparatus 1, is not configured during carrier aggregation when the base station apparatus 2 configures the secondary cell (addition) or reconfigures with respect to the mobile station apparatus 1.

Here, as a first interpretation of the mobile station apparatus capability, the base station apparatus 2 interprets the mobile station apparatus capability as "when the base station apparatus 2 configures carrier aggregation for the mobile station apparatus 1 based on the BandCombinationParameters, the base station apparatus 2 may configure carrier aggregation which requires the management of the uplink transmission timing in a range of 1 to maximum value, in each frequency band".

That is, in the first interpretation, at the time of configuring carrier aggregation based on the BandCombinationParameters#1 in the mobile station apparatus 1, the base station apparatus 2 interprets that the configuration of carrier aggregation of which the necessary uplink transmission timing is one and the configuration of carrier aggregation of which the necessary uplink transmission timing is two may be performed, in each group of band parameters 1 (BandParameters#1) and band parameters 2 (BandParameters#2).

In addition, in the first interpretation, at the time of configuring carrier aggregation based on the BandCombinationParameters#2 in the mobile station apparatus 1, in each group of band parameters 3 (BandParameters#3) and band parameters 4 (BandParameters#4), the base station apparatus 2 interprets that: (i) the configuration of carrier aggregation which requires only the management of one uplink transmission timing, (ii) the configuration of carrier aggregation which requires the management of two separate uplink transmission timings by the BandParameters#3 and the BandParameters#4 respectively, (iii) and further, configuration of carrier aggregation which requires the management of two uplink transmission timings by the BandParameters#3, and (iv) configuration of carrier aggregation which requires the management of two or more uplink transmission timings by the BandParameters#4, may be performed.

However, in a case where the mobile station apparatus 1 already operates in a maximum number of transmission timings that can be supported by the mobile station apparatus 1, the base station apparatus 2 cannot further configure carrier aggregation which requires a different management of the uplink transmission timing. For example, even in a case (BandCombinationParameters#2) where carrier aggregation can be performed by the mobile station apparatus 1 in the combination of the frequency band 1 (bandEUTRA#1) and the frequency band 5 (bandEUTRA#5), in a case where carrier aggregation which requires the management of two uplink transmission timings in the frequency band 1 is configured, when a management of the uplink transmission timing is required due to adding of the cell of the frequency band 5 (that is, three uplink transmission timings are required), the base station apparatus 2 cannot configure the cell in the mobile station apparatus 1.

In addition, as a second interpretation of the mobile station apparatus capability, the base station apparatus 2 interprets the mobile station apparatus capability as "when the base station apparatus 2 configures carrier aggregation for the mobile station apparatus 1 based on the BandCombinationParameters, the base station apparatus 2 may configure carrier aggregation which requires the management of maximum one uplink transmission timing, in each group of band parameters (BandParameters)".

That is, as the second interpretation, at the time of configuring carrier aggregation based on the BandCombinationParameters#1 in the mobile station apparatus 1, the base station apparatus 2 interprets that carrier aggregation which requires only one uplink transmission timing can be configured, in each group of band parameters 1 (BandParameters#1) and band parameters 2 (BandParameters#2). In addition, at the time of configuring carrier aggregation based on the BandCombinationParameters#2 in the mobile station apparatus 1, in each group of band parameters 3 (BandParameters#3) and band parameters 4 (BandParameters#4), the base station apparatus 2 interprets that carrier aggregation which requires only one uplink transmission timing can be configured. That is, the base station apparatus 2 interprets that carrier aggregation which requires two or more uplink transmission timings should not be performed, in each group of band parameters (BandParameters).

In addition, the mobile station apparatus 1 may not configure, as the number of uplink transmission timing support (number of support UL timing) supported by the mobile station apparatus 1, one maximum value but may configure the plural number of supported uplink transmission timings or a range of the number of supported uplink transmission timings. For example, in a case where the maximum number of uplink transmission timing support is three, the mobile station apparatus 1 may configure values of 1 and 3 which indicate the beginning and end of the values as the parameter, or may configure the value from 1 to maximum (3) (1, 2, 3) as the parameters.

Moreover, in FIG. 4, an example of the maximum number of supported uplink transmission timings (Number of Support UL timing) being included as a part of the combination of frequency bands (SupportedBandCombination) is illustrated. However, it may be configured independent of the combination of the frequency bands (SupportedBandCombination).

Figure 5:
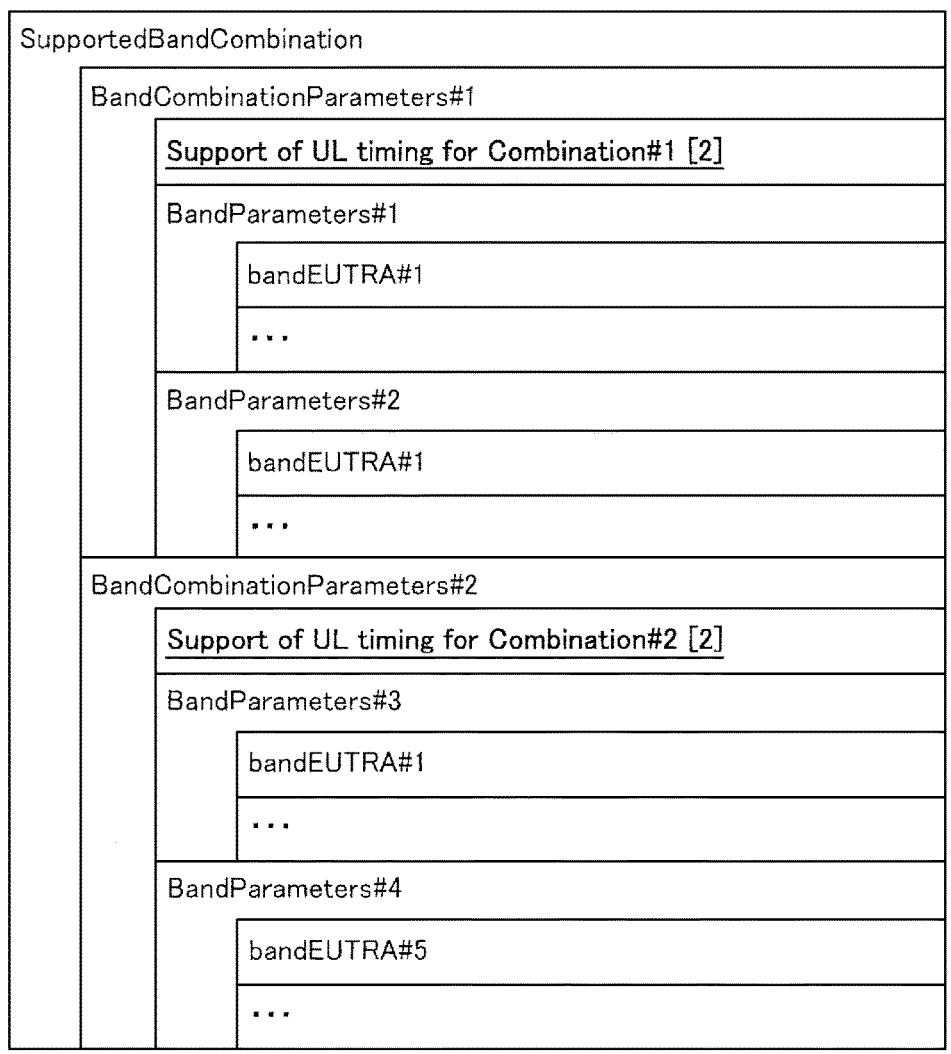
FIG. 5 is another diagram illustrating a message structure of the mobile station apparatus capability that configures the number of the supported uplink transmission timings in the first embodiment of the invention.

FIG. 5 is a diagram illustrating another example of a correspondence relationship between the frequency band and the combination of the frequency bands supported by the mobile station apparatus 1 and the capability information on the uplink transmission timing, in the mobile station apparatus capability notification message that is used as a determination criteria whether or not the base station apparatus 2 can add the secondary cell having the uplink transmission timing different from that of primary cell with respect to the mobile station apparatus 1.

In FIG. 5, as a parameter indicating the maximum number of uplink transmission timings supported by the mobile station apparatus 1, the number of supported uplink transmission timings for each combination of frequency bands (Support of UL timing for Combination) is included in the message structure (BandCombinationParameters) indicating the combination of the frequency bands respectively. The number of uplink transmission timing support for each combination of frequency bands is designated as integers equal to or larger than one (1, 2, 3, . . . ). Moreover, the mobile station apparatus 1 may implicitly notify the base station apparatus 2 that the number of uplink transmission timing support in the combination of the frequency bands is one by omitting the configuration of the parameter. In this case, it is preferable that the number of uplink transmission timing support for each combination of the frequency bands is designated as integers equal to or larger than 2 (2, 3, . . . ).

The number of uplink transmission timing support (Support of UL timing for Combination) for each combination of the frequency bands is applied with respect to the combination of frequency bands (BandCombinationParameters). That is, (i) the number of uplink transmission timing support in the BandCombinationParameters#1 is configured as the Support of UL timing for Combination#1, and is applied to the BandParameters#1 and BandParameters#2, (ii) the number of uplink transmission timing support in the BandCombinationParameters#2 is configured as the Support of UL timing for Combination#2, and is applied to the BandParameters#3 and BandParameters#4.

FIG. 5 illustrates the structure of the mobile station apparatus capability in a case where the number of uplink transmission timing support (Support of UL timing for Combination#1) in the combination of frequency bands 1 (BandCombinationParameters#1) is two, and in a case where the number of uplink transmission timing support (Support of UL timing for Combination#2) in the combination of frequency bands 2 (BandCombinationParameters#2) is two.

The base station apparatus 2 can determine the uplink transmission timing that can be configured with respect to the combinations of frequency bands (BandCombinationParameters) that is supported by the mobile station apparatus 1, based on the mobile station apparatus capability message configured as illustrated in FIG. 5.

Here, as a first interpretation of the mobile station apparatus capability, the base station apparatus 2 interprets the mobile station apparatus capability as "when carrier aggregation is configured in the mobile station apparatus 1 based on the BandCombinationParameters, the base station apparatus 2 may configure carrier aggregation which requires the management of the uplink transmission timing in a range of one to maximum value, in each frequency band".

That is, as the first interpretation, at the time of configuring carrier aggregation based on the BandCombinationParameters#1 in the mobile station apparatus 1, the base station apparatus 2 interprets that the configuration of carrier aggregation of which the necessary uplink transmission timing is any of one or two may be performed, in each group of band parameters 1 (BandParameters#1) or band parameters 2 (BandParameters#2).

In addition, as the first interpretation, at the time of configuring carrier aggregation based on the BandCombinationParameters#2 in the mobile station apparatus 1, in each group of band parameters 3 (BandParameters#3) and band parameters 4 (BandParameters#4), the base station apparatus 2 interprets that: (i) the configuration of carrier aggregation of which only the management of one uplink transmission timing is necessary, (ii) the configuration of carrier aggregation of which the management of two separate uplink transmission timings is necessary by the BandParameters#3 and the BandParameters#4 respectively, (iii) further, configuration of carrier aggregation of which the management of two uplink transmission timings is necessary by the BandParameters#3, and (iv) configuration of carrier aggregation of which the management of two uplink transmission timings is necessary by the BandParameters#4, may be performed.

However, in a case where the mobile station apparatus 1 already operates in a maximum number of uplink transmission timings that can be supported by the mobile station apparatus 1, the base station apparatus 2 cannot further configure carrier aggregation which requires a different management of the uplink transmission timing. For example, even in a case (BandCombinationParameters#2) where carrier aggregation can be performed by the mobile station apparatus 1 in the combination of the frequency band 1 (bandEUTRA#1) and the frequency band 5 (bandEUTRA#5), in a case where carrier aggregation which requires the management of two uplink transmission timings in the frequency band 1, when an additional management of the uplink transmission timing is required due to adding of the cell of the frequency band 5 (that is, three uplink transmission timings are required), the base station apparatus 2 cannot configure the cell in the mobile station apparatus 1.

In addition, as a second interpretation of the mobile station apparatus capability, the base station apparatus 2 interprets the mobile station apparatus capability as "when carrier aggregation is configured in the mobile station apparatus 1 based on the BandCombinationParameters, the base station apparatus 2 may configure carrier aggregation which requires the management of maximum one uplink transmission timing, in each group of frequency bands (BandParameters)".

That is, as the second interpretation, at the time of configuring carrier aggregation based on the BandCombinationParameters#1 in the mobile station apparatus 1, the base station apparatus 2 interprets that carrier aggregation which requires only one uplink transmission timing can be configured, in each group of band parameters 1 (BandParameters#1) and band parameters 2 (BandParameters#2). In addition, at the time of configuring carrier aggregation based on the BandCombinationParameters#2 in the mobile station apparatus 1, in each group of band parameters 3 (BandParameters#3) and band parameters 4 (BandParameters#4), the base station apparatus 2 interprets that carrier aggregation which requires only one uplink transmission timing can be configured. That is, the base station apparatus 2 interprets that carrier aggregation which requires two or more uplink transmission timings should not be performed, in each group of band parameters (BandParameters).

In addition, the mobile station apparatus 1, as the number of uplink transmission timing support (Support of UL timing for Combination) for each combination of the frequency bands, may not configure one maximum value but may configure the plural number of supported uplink transmission timings or a range of the number of supported uplink transmission timings. For example, in a case where the maximum number of uplink transmission timing support (Support of UL timing for Combination #1) in the combination of frequency bands 1 (BandCombinationParameters#1) is three, the mobile station apparatus 1 may configure value of 1 and 3 which indicate the beginning and end of the values as the parameter, or may configure the three values from 1 to maximum (3) (1, 2, 3) as the parameters.

Moreover, in FIG. 5, an example of the number of supported uplink transmission timings (Support of UL timing for Combination) for each combination of the frequency bands being included as a part of the combination of frequency bands (SupportedBandCombination) is illustrated. However, it may be configured independent of the combination of the frequency bands (SupportedBandCombination).

Figure 6:
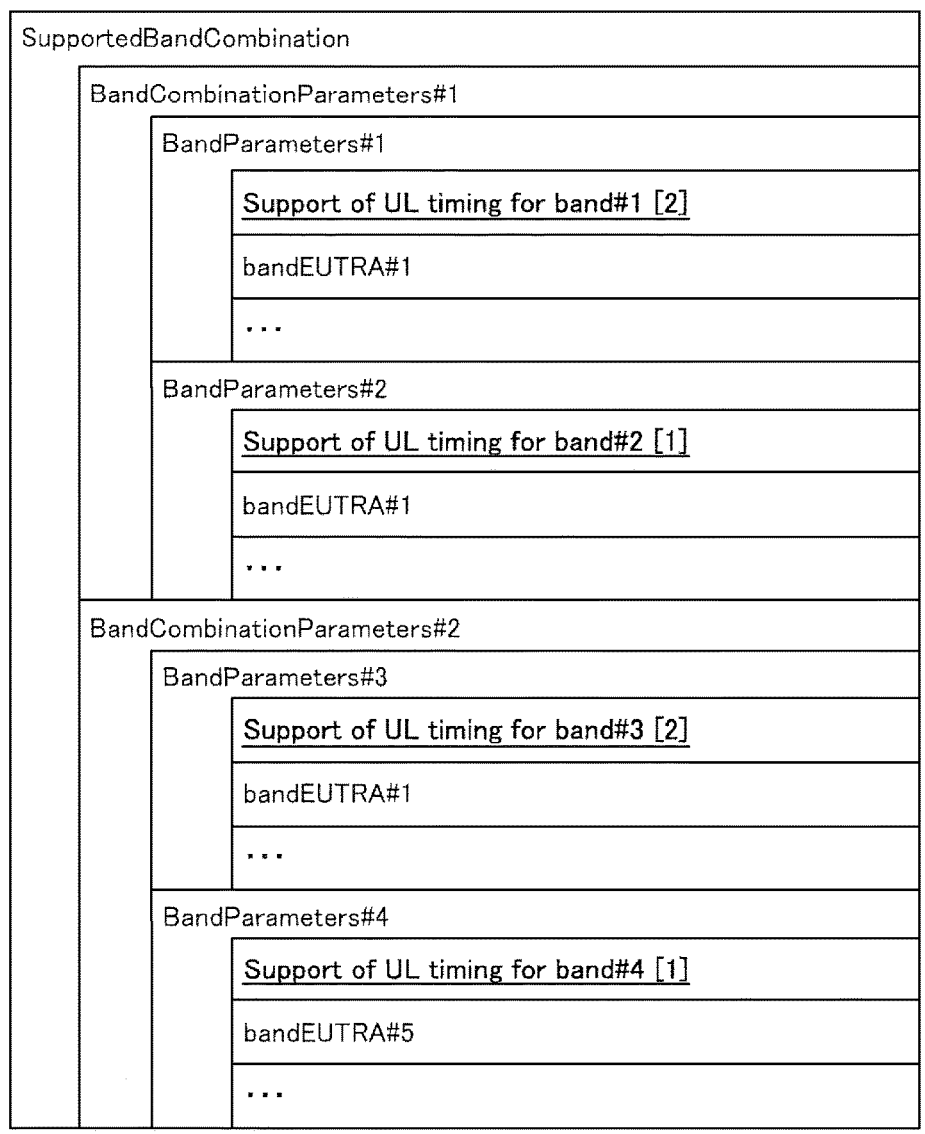
FIG. 6 is another diagram illustrating a message structure of the mobile station apparatus capability that configures the number of the supported uplink transmission timings in the first embodiment of the invention.

FIG. 6 is a diagram illustrating another example of a correspondence relationship between the frequency band supported by the mobile station apparatus 1 and the capability information on the uplink transmission timing, in the mobile station apparatus capability notification message that is used as a determination criteria whether or not the base station apparatus 2 can add the secondary cell having the uplink transmission timing different from that of primary cell to the mobile station apparatus 1.

In FIG. 6, as a parameter indicating the maximum number of uplink transmission timing supported by the mobile station apparatus 1, the number of uplink transmission timing support for each group of band parameters (Support of UL timing for Band) is included in the message structure configuring the group of band parameters (BandParameters) respectively. The number of uplink transmission timing support for each group of band parameters is designated as integers equal to or larger than one (1, 2, 3, . . . ). Moreover, the mobile station apparatus 1 may implicitly notify the base station apparatus 2 that the number of uplink transmission timing support for the group of band parameters is one by omitting the configuration of the parameter. In this case, it is preferable that the number of uplink transmission timing support for each group of band parameters is designated as integers equal to or larger than two (2, 3, . . . ).

The number of uplink transmission timing support (Support of UL timing for Band) for each group of band parameters is applied with respect to the frequency band (bandEUTRA) of the group of band parameters. That is, (i) the number of uplink transmission timing support in the BandParameters#1 is configured as the Support of UL timing for Band#1, and is applied to the BandParameters#1 (bandEUTRA#1), (ii) the number of uplink transmission timing support in the BandParameters#2 is configured as the Support of UL timing for Band#2, and is applied to the BandParameters#2 (bandEUTRA#1).

FIG. 6 illustrates the structure of the mobile station apparatus capability in a case where the number of uplink transmission timing support (Support of UL timing for Band) in each group of the band parameters indicates one or two, and in a case where the combination of frequency bands (BandCombinationParameters) that can be aggregated in the uplink is two.

The base station apparatus 2 can determine the uplink transmission timing that can be configured with respect to the group of band parameters (BandParameters) that is supported by the mobile station apparatus 1, based on the mobile station apparatus capability message configured as illustrated in FIG. 6.

Here, the base station apparatus 2 interprets that "when carrier aggregation is configured in the mobile station apparatus 1 based on the BandCombinationParameters, the base station apparatus 2 may configure carrier aggregation which requires the management of the uplink transmission timing in a range of one to maximum value, in each frequency band".

That is, at the time of configuring carrier aggregation based on the BandCombinationParameters#1 in the mobile station apparatus 1, (i) the base station apparatus 2 interprets that the configuration of carrier aggregation of which the necessary uplink transmission timing is one, and of which the necessary uplink transmission timing is two may be performed, in the group of band parameters 1 (BandParameters#1), and (ii) the base station apparatus 2 interprets that the configuration of carrier aggregation of which the necessary uplink transmission timing is one may be performed, in the group of band parameters 2 (BandParameters#2). That is, in the BandCombinationParameters#1, the base station apparatus 2 interprets that the configuration of carrier aggregation of which the management of maximum three uplink transmission timings is necessary may be performed.

In addition, at the time of configuring carrier aggregation based on the BandCombinationParameters#2 in the mobile station apparatus 1, in each group of band parameters 3 (BandParameters#3) and band parameters 4 (BandParameters#4), the base station apparatus 2 interprets that: (i) the configuration of carrier aggregation of which only the management of one uplink transmission timing is necessary respectively, (ii) the configuration of carrier aggregation of which the management of one or two uplink transmission timings is necessary by the BandParameters#3, (iii) and further, configuration of carrier aggregation of which the management of one uplink transmission timing is necessary by the BandParameters#4 are performed. That is, the base station apparatus 2 interprets that the configuration of carrier aggregation of which the management of maximum three or more uplink transmission timings is necessary may be performed, in the BandCombinationParameter#2.

In addition, the mobile station apparatus 1, as the number of uplink transmission timing support (Support UL timing for Band) for each group of band parameters, may not configure one maximum value but may configure the plural number of supported uplink transmission timings or a range of the number of supported uplink transmission timings. For example, in a case where the maximum number of uplink transmission timing support is three, the mobile station apparatus 1 may configure values of 1 and 3 which indicate the beginning and end of the values as the parameter, or may configure the value from 1 to maximum (3) (1, 2, 3) as the parameters.

In this way, according to the first embodiment, in determining whether or not the cell (secondary cell) having an uplink frequency (uplink component carrier) in which the uplink transmission timing is not adjusted can be configured in the mobile station apparatus 1, the base station apparatus 2 can perform configuration based on the mobile station apparatus capability information received from the mobile station apparatus 1. In addition, the mobile station apparatus 1 can correctly notify the base station apparatus 2 of the mobile station apparatus capability that indicates whether the communication using the cell (component carrier) of which the uplink transmission timing is different is possible or not.

By the configuration as in the first embodiment, it is possible to solve the problem in that the base station apparatus 2 configures the plurality of uplink transmission timings with respect to the mobile station apparatus 1 which does not support the transmission in the plurality of uplink transmission timings.

The mobile station apparatus 1 in the embodiment notifies (reports) the base station apparatus 2 of the mobile station apparatus capability which relates to the uplink transmission timing at the time of carrier aggregation. The mobile station apparatus 1 notifies the base station apparatus 2 regarding the uplink transmission timing that can be supported for every combination of frequency bands or for each frequency band, for each combination of frequency bands. In this way, the mobile station apparatus 1 can appropriately notify the base station apparatus 2 of its own capability. Therefore, carrier aggregation for the mobile station apparatus 1 can be appropriately configured according to a state of the surrounding cells and the radio quality from the base station apparatus 2. Consequently, it is possible to improve the throughput of the mobile station apparatus 1.

In addition, the base station apparatus 2 in the embodiment can effectively configure the secondary cell of which the uplink transmission timing is different, based on the mobile station apparatus capability notified (reported) by the mobile station apparatus 1. If it is necessary, the base station apparatus 2 can configure the physical random access channel which is applied to the random access procedure executed in the secondary cell when the secondary cell is added or changed. In addition, by using a group identifier, the base station apparatus 2 can configure a group of cells that have the same uplink transmission timing as the secondary cell when the secondary cell is added or changed. In addition, the base station apparatus 2 can initiate the random access procedure with respect to the secondary cell, according to the necessity. In this way, the base station apparatus 2 can perform the appropriate scheduling based on the mobile station apparatus capability.

Second Embodiment

The second embodiment of the invention will be described below. In the first embodiment, the method has been illustrated, in which the parameter indicating the capability of the plurality of uplink transmission timings in the mobile station apparatus 1 is added to the structure of parameter of the mobile station apparatus capability in the related art. However, considering the backward compatibility of the structure of the message, there is a case where it is preferable that the parameter is configured as a separate parameter, rather than changing the structure of the parameter in the related art.

Thus, in the second embodiment of the invention, a method of configuring the mobile station apparatus capability information indicating a plurality of uplink transmission timings as a separate parameter will be described. Since the configuration of the mobile station apparatus 1 and the base station apparatus 2 used in the embodiment may be the same as the configuration in FIG. 1 and FIG. 2, the description will be omitted. In addition, for the network configuration of the communication system in which the mobile station apparatus 1 and the base station apparatus 2 are arranged, the same configuration as illustrated in FIG. 17 can be applied.

FIG. 7 is a diagram illustrating an example of configuring a correspondence relationship between the combination of the frequency bands supported by the mobile station apparatus 1 and the capability information on the uplink transmission timing as a parameter list, in the mobile station apparatus capability notification message that is used as a determination criteria whether or not the base station apparatus 2 can add the secondary cell having the uplink transmission timing different from that of the primary cell to the mobile station apparatus 1.

In FIG. 7, as a parameter indicating the maximum number of uplink transmission timings supported by the mobile station apparatus 1, a list of the numbers of uplink transmission timing support (Support List of UL timing for Band Combination) for each combination of frequency bands is included in the structure of the mobile station apparatus capability message. In addition, a list length of the list of the numbers of uplink transmission timing support for each combination of frequency bands is equal to the number of the combinations of the frequency bands (BandCombinationParameters). In the list length, the parameter (Number of UL timing for Combination) indicating the maximum number of uplink transmission timings for each combination of the frequency bands is configured.

In other words, the mobile station apparatus capability which relates to the number of supported uplink transmission timings is configured with three parameters (Support List of UL timing for Band Combination, BandCombinationParameters and Number of UL timing for Combination).

FIG. 7 illustrates an example of the list of the number of uplink transmission timing support (Support List of UL timing for Band Combination) for each combination of frequency bands that includes four combinations of frequency bands (BandCombinationParameters#1 to BandCombinationParameters#4), and configuration of the parameter indicating the maximum number of uplink transmission timing (Number of UL timing for Combination#1 to Number of UL timing for Combination#4) for each combination of the frequency bands corresponding to respective BandCombinationParameters.

In this case, the parameter indicating the maximum number of uplink transmission timing (Number of UL timing for Combination) for each combination of frequency bands is designated as integers equal to or larger than 1 (1, 2, 3, . . . ).

In addition, by the parameters being configured so as to correspond one-to-one with the combination of the frequency bands by the list in which the parameters are configured, the mobile station apparatus 1 can configure a list only with the parameters indicating the maximum number of uplink transmission timing for each combination of the frequency bands (Number of UL timing for Combination) with omitting the parameters indicating the combination of the frequency bands (BandCombinationParameters). In this case, the mobile station apparatus capability which relates to the number of supported uplink transmission timings is configured with two parameters (Support List of UL timing for Band Combination and Number of UL timing for Combination).

The base station apparatus 2 can determine the uplink transmission timing that can be configured with respect to the combination of frequency bands (BandCombinationParameters) supported by the mobile station apparatus 1 based on the mobile station apparatus capability message configured as in FIG. 7.

Here, in a case where the base station apparatus 2 configures carrier aggregation based on the BandCombinationParameters in the mobile station apparatus 1, the base station apparatus 2 configures carrier aggregation with applying the first interpretation or the second interpretation described in the first embodiment.

In addition, FIG. 8 is a diagram illustrating an example of configuration of a correspondence relationship between the frequency bands supported by the mobile station apparatus 1 and the capability information on the uplink transmission timing as a parameter list, in the mobile station apparatus capability notification message that is used as a determination criteria whether or not the base station apparatus 2 can add the secondary cell having the uplink transmission timing different from that of the primary cell with respect to the mobile station apparatus 1.

In FIG. 8, as a parameter indicating the maximum number of uplink transmission timing supported by the mobile station apparatus 1, a list of the numbers of uplink transmission timing support supported by the mobile station apparatus 1 (Support List of UL timing for Band) for each frequency band is included in the structure of the mobile station apparatus capability message. In addition, a list length of the list of the numbers of uplink transmission timing support for each frequency band is equal to the number of the frequency bands (bandEUTRA). In the list length, the parameter (Number of UL timing for Band) indicating the maximum number of uplink transmission timings for each frequency band is configured. In other words, the mobile station apparatus capability which relates to the number of supported uplink transmission timings is configured with three parameters (Support List of UL timing for Band, bandEUTRA and Number of UL timing for Band).

FIG. 8 illustrates an example of the list of the number of uplink transmission timing support (Support List of UL timing for Band) for each frequency band that includes four frequency bands (bandEUTRA#1 to bandEUTRA #4), and configuration of the parameter indicating the maximum number of uplink transmission timing (Number of UL timing for Band#1 to Number of UL timing for Band#4) corresponding to each bandEUTRA.

In this case, the parameter indicating the maximum number of uplink transmission timing (Number of UL timing for Band) for each combination of frequency bands is designated as integers equal to or larger than one (1, 2, 3, . . . ).

In addition, by the parameters being configured so as to correspond one-to-one with the frequency band by the list in which the parameters are configured, the mobile station apparatus 1 can configure a list only with the parameter indicating the maximum number of uplink transmission timing for each frequency band (Number of UL timing for Band) with omitting the parameter indicating the frequency band (bandEUTRA). In this case, the mobile station apparatus capability which relates to the number of supported uplink transmission timings is configured with two parameters (Support List of UL timing for Band and Number of UL timing for Band).

Moreover, the mobile station apparatus 1 can also notify the base station apparatus 2 of (i) the maximum number of supported uplink transmission timings (for example, Number of Support UL timing in FIG. 4), and (ii) the maximum number of supported uplink transmission timings for each combination of frequency bands (for example, Support of UL timing for Combination in FIG. 5), if necessary.

The base station apparatus 2 can determine the maximum uplink transmission timings that can be configured in the mobile station apparatus 1 for each corresponding frequency band (bandEUTRA), based on the notified mobile station apparatus capability message.

Here, in a case where the base station apparatus 2 configures carrier aggregation based on the BandCombinationParameters in the mobile station apparatus 1, the base station apparatus 2 configures carrier aggregation with applying the first interpretation or the second interpretation described in the first embodiment.

In this way, according to the second embodiment, in determining whether or not the cell (secondary cell) having an uplink frequency (uplink component carrier) in which the uplink transmission timing is not adjusted can be configured in the mobile station apparatus 1, the base station apparatus 2 can perform the configuration based on the mobile station apparatus capability information received from the mobile station apparatus 1. In addition, the mobile station apparatus 1 can correctly notify the base station apparatus 2 of the mobile station apparatus capability that indicates whether the communication using the cell (component carrier) of which the uplink transmission timing is different is possible or not.

By the configuration as in the second embodiment, it is possible to solve the problem in that the base station apparatus 2 configures the plurality of uplink transmission timings with respect to the mobile station apparatus 1 which does not support the transmission in the plurality of uplink transmission timings.

The mobile station apparatus 1 in the embodiment notifies (reports) the base station apparatus 2 of the mobile station apparatus capability which relates to the uplink transmission timing at the time of carrier aggregation. The mobile station apparatus 1 notifies the base station apparatus 2 of the uplink transmission timing list that can be supported for each combination of frequency bands, or for each combination of frequency band. In this way, the mobile station apparatus 1 can appropriately notify the base station apparatus 2 of its own capability. Therefore, carrier aggregation for the mobile station apparatus 1 can be appropriately configured according to state of the surrounding cells and the radio quality from the base station apparatus 2. Consequently, it is possible to improve the throughput of the mobile station apparatus 1.

In addition, the base station apparatus 2 in the embodiment can effectively configure the secondary cell of which the uplink transmission timing is different, based on the mobile station apparatus capability notified (reported) by the mobile station apparatus 1. If necessary, the base station apparatus 2 can configure the physical random access channel which is applied to the random access procedure executed in the secondary cell when the secondary cell is added or changed. In addition, by using a group identifier, the base station apparatus 2 can configure a group of cells that has the same uplink transmission timing as the secondary cell when the secondary cell is added or changed. In addition, the base station apparatus 2 can initiate the random access procedure with respect to the secondary cell, if necessary. In this way, the base station apparatus 2 can perform the appropriate scheduling based on the mobile station apparatus capability.

Third Embodiment

The third embodiment of the invention will be described below. In the third embodiment of the invention, as the mobile station apparatus capability which indicates a plurality of uplink transmission timings, a method of realizing the reduction of a message amount of the mobile station apparatus capability message by assigning one bit of identifier for each combination of frequency bands or each frequency band will be described. Since the configuration of the mobile station apparatus 1 and the base station apparatus 2 used in the embodiment may be the same as the configuration in FIG. 1 and FIG. 2, the description will be omitted. In addition, for the network configuration of the communication system in which the mobile station apparatus 1 and the base station apparatus 2 are arranged, the same configuration as illustrated in FIG. 17 can be applied.

FIG. 9 is a diagram illustrating an example of configuration of a correspondence relationship between the combination of the frequency bands supported by the mobile station apparatus 1 and the capability information on the uplink transmission timing by information of one bit of identifier respectively, in the mobile station apparatus capability notification message that is used as a determination criteria whether or not the base station apparatus 2 can add the secondary cell having the uplink transmission timing different from that of primary cell with respect to the mobile station apparatus 1.

In FIG. 9, as a parameter indicating whether or not a plurality of uplink transmission timings can be supported by the mobile station apparatus 1, an uplink transmission timing support indication (Support indication of UL timing for Band Combination) for each combination of frequency bands is included in the structure of the mobile station apparatus capability message. In addition, a list length of the uplink transmission timing support indication for each combination of frequency bands is equal to the number of the combinations of the frequency bands (BandCombinationParameters). In the list length, the parameter (True or False) indicating whether or not a plurality of uplink transmission timings can be supported for each combination of the frequency bands is configured.

In other words, the mobile station apparatus capability which relates to the number of supported uplink transmission timings is configured with three parameters (Support indication of UL timing for Band Combination, BandCombinationParameters and True/False). Moreover, instead of the True/False, other parameters such as 1 or 0, or supported/non-supported which have the same meaning as the parameter may be configured.

FIG. 9 illustrates an example of the uplink transmission timing support indication (Support indication of UL timing for Band Combination) for each combination of frequency bands that includes four combinations of frequency bands (BandCombinationParameters#1 to BandCombinationParameters#4), and configuration of the parameter (True/False) indicating whether or not uplink transmission timings can be supported for each combination of the frequency bands corresponding to each BandCombinationParameters.

In addition, by the parameters being configured so as to correspond one-to-one with the combination of the frequency bands by the list in which the parameters are configured, the mobile station apparatus 1 can configure a list only with the parameter (True/False) indicating whether or not uplink transmission timings can be supported for each combination of the frequency bands with omitting the parameter indicating the combination of the frequency bands (BandCombinationParameters). In this case, the mobile station apparatus capability which relates to the number of supported uplink transmission timings is configured with two parameters (Support indication of UL timing for Band Combination and True/False).

Moreover, the mobile station apparatus 1 can also notify the base station apparatus 2 of (i) the maximum number of supported uplink transmission timings (for example, Number of Support UL timing in FIG. 4), and (ii) the maximum number of supported uplink transmission timings for each combination of frequency bands (for example, Support of UL timing for Combination in FIG. 5), if necessary.

In addition, the mobile station apparatus 1 can also be configured so as to notify the base station apparatus 2 whether or not the uplink transmission timing corresponding to the frequency band under carrier aggregation is possible by notifying whether or not the plurality of uplink transmission timing can be supported for each frequency band (bandEUTRA) included in the combination of frequency bands (BandCombinationParameters).

The base station apparatus 2 can determine the maximum uplink transmission timings that can be configured in the mobile station apparatus 1 for each combination of corresponding frequency bands (BandCombinationParameters), based on the notified mobile station apparatus capability message.

In addition, FIG. 10 is a diagram illustrating an example of configuration of a correspondence relationship between the frequency band supported by the mobile station apparatus 1 and the capability information on the uplink transmission timing by information of one bit of identifier respectively, in the mobile station apparatus capability notification message that is used as a determination criteria whether or not the base station apparatus 2 can add the secondary cell having the uplink transmission timing different from that of the primary cell with respect to the mobile station apparatus 1.

In FIG. 10, as a parameter indicating whether or not a plurality of uplink transmission timings can be supported by the mobile station apparatus 1, an uplink transmission timing support indication (Support indication of UL timing for Band) for each frequency band is included in the structure of the mobile station apparatus capability message. In addition, a list length of the Support Indication of UL timing for Band for each frequency band is equal to the number of the supported frequency bands (bandEUTRA). In the list length, the parameter (True or False) indicating whether or not a plurality of uplink transmission timings can be supported for each frequency band is configured. In other words, the mobile station apparatus capability which relates to the number of supported uplink transmission timings is configured with three parameters (Support indication of UL timing for Band, bandEUTRA and True/False). Moreover, instead of the True/False, other parameters such as 1 or 0, or Supported/Non-supported which have the same meaning as the parameter may be configured.

FIG. 10 illustrates an example of the uplink transmission timing support indication (Support indication of UL timing for Band) for each frequency band that includes four frequency bands (bandEUTRA#1 to bandEUTRA #4), and configuration of the parameter (True/False) indicating whether or not uplink transmission timings can be supported for each frequency band corresponding to each bandEUTRA.

In addition, by the parameters being configured so as to correspond one-to-one with the supported frequency band by the list in which the parameters are configured, the mobile station apparatus 1 can configure a list only with the parameter (True/False) indicating whether or not a plurality of uplink transmission timings can be supported for each frequency band with omitting the parameter indicating the frequency bands (bandEUTRA). In this case, the mobile station apparatus capability which relates to the number of supported uplink transmission timings is configured with two parameters (Support indication of UL timing for Band and True/False).

Moreover, the mobile station apparatus 1 can also notify the base station apparatus 2 of (i) the maximum number of supported uplink transmission timings (for example, Number of Support UL timing in FIG. 4), and (ii) the maximum number of supported uplink transmission timings for each combination of frequency bands (for example, Support of UL timing for Combination in FIG. 5), if necessary.

The base station apparatus 2 can determine the maximum uplink transmission timings that can be configured in the mobile station apparatus 1 for each corresponding frequency band (bandEUTRA), based on the notified mobile station apparatus capability message.

In this way, according to the third embodiment, in determining whether or not the cell (secondary cell) having an uplink frequency (uplink component carrier) in which the uplink transmission timing is not adjusted can be configured in the mobile station apparatus 1, the base station apparatus 2 can perform the configuration based on the mobile station apparatus capability information received from the mobile station apparatus 1. In addition, the mobile station apparatus 1 can correctly notify the base station apparatus 2 of the mobile station apparatus capability that indicates whether the communication using the cell (component carrier) of which the uplink transmission timing is different is possible or not.

By the configuration as in the third embodiment, it is possible to solve the problem in that the base station apparatus 2 configures the plurality of uplink transmission timings with respect to the mobile station apparatus 1 which does not support the transmission in the plurality of uplink transmission timings.

The mobile station apparatus 1 in the embodiment notifies (reports) the base station apparatus 2 of the mobile station apparatus capability which relates to the uplink transmission timing at the time of carrier aggregation. The mobile station apparatus 1 notifies the base station apparatus 2 whether or not the uplink transmission timing can be supported for each combination of frequency bands, or for each frequency band. In this way, the mobile station apparatus 1 can appropriately notify the base station apparatus 2 of its own capability. Therefore, carrier aggregation for the mobile station apparatus 1 can be appropriately configured according to state of the surrounding cells and the radio quality from the base station apparatus 2. Consequently, it is possible to improve the throughput of the mobile station apparatus 1.

In addition, the base station apparatus 2 in the embodiment can effectively configure the secondary cell of which the uplink transmission timing is different, based on the mobile station apparatus capability notified (reported) by the mobile station apparatus 1. If necessary, the base station apparatus 2 can configure the physical random access channel which is applied to the random access procedure executed in the secondary cell when the secondary cell is added or changed. In addition, by using a group identifier, the base station apparatus 2 can configure a group of cells that has the same uplink transmission timing as the secondary cell when the secondary cell is added or changed. In addition, the base station apparatus 2 can initiate the random access procedure with respect to the secondary cell, if necessary. In this way, the base station apparatus 2 can perform the appropriate scheduling based on the mobile station apparatus capability.

Fourth Embodiment

The fourth embodiment of the invention will be described below. In the fourth embodiment of the invention, as the mobile station apparatus capability which indicates a plurality of uplink transmission timings, a method of realizing the further reduction of a message amount of the mobile station apparatus capability message by assigning one bit of identifier according to the type of the combination of frequency bands will be described. Since the configuration of the mobile station apparatus 1 and the base station apparatus 2 used in the embodiment may be the same as the configuration in FIG. 1 and FIG. 2, the description will be omitted. In addition, for the network configuration of the communication system in which the mobile station apparatus 1 and the base station apparatus 2 are arranged, the same configuration as illustrated in FIG. 17 can be applied.

Figure 11:
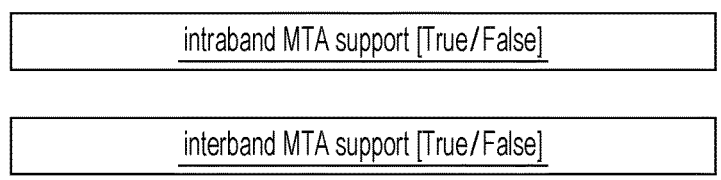
FIG. 11 is a diagram illustrating a message structure of the mobile station apparatus capability that configures the number of supported uplink transmission timings in a fourth embodiment of the invention.

FIG. 11 is a diagram illustrating an example of configuration of a correspondence relationship between the type of the combination of the frequency bands supported by the mobile station apparatus 1 and the capability information on the uplink transmission timing by information of one bit of identifier respectively, in the mobile station apparatus capability notification message that is used as a determination criteria whether or not the base station apparatus 2 can add the secondary cell having the transmission timing different from that of the primary cell with respect to the mobile station apparatus 1.

In FIG. 11, as a parameter indicating whether or not a plurality of uplink transmission timings can be supported by the mobile station apparatus 1, (i) a parameter (intra-band MTA (Multi-Timing Advance) support) in which an indication of whether or not a plurality of uplink transmission timings can be supported is configured, in each of intra-band contiguous carrier aggregation and inter-band non-contiguous carrier aggregation, and (ii) a parameter (inter-band MTA (Multi-Timing Advance) support) in which an indication that indicates whether or not a plurality of uplink transmission timings can be supported is configured, in each of intra-band contiguous carrier aggregation and intra-band non-contiguous carrier aggregation, are configured.

In a case where the plurality of uplink transmission timings are supported, "True" is configured to each parameter (indication), and in a case where the plurality of uplink transmission timings is not supported, "False" is configured. Moreover, instead of the True/False, other parameters such as 1 or 0, or Supported/Non-supported which have the same meaning as the parameter may be configured.

Moreover, in this case, intra-band contiguous carrier aggregation and intra-band non-contiguous carrier aggregation may be independent parameters respectively. Similarly, inter-band contiguous carrier aggregation and inter-band non-contiguous carrier aggregation may be independent parameters respectively.

Moreover, the mobile station apparatus 1 can also notify the base station apparatus 2 of the maximum number of supported uplink transmission timings (for example, Number of Support UL timing in FIG. 4), if necessary.

The base station apparatus 2 can determine the maximum uplink transmission timings that can be configured in the mobile station apparatus 1 for each type of combination of corresponding frequency bands based on the notified mobile station apparatus capability message.

In this way, according to the fourth embodiment, in determining whether or not the cell (secondary cell) having an uplink frequency (uplink component carrier) in which the uplink transmission timing is not adjusted can be configured in the mobile station apparatus 1, the base station apparatus 2 can perform the configuration based on the mobile station apparatus capability information received from the mobile station apparatus 1. In addition, the mobile station apparatus 1 can correctly notify the base station apparatus 2 of the mobile station apparatus capability that indicates whether the communication using the cell (component carrier) of which the uplink transmission timing is different is possible or not.

By the configuration as in the fourth embodiment, it is possible to solve the problem in that the base station apparatus 2 configures the plurality of uplink transmission timings with respect to the mobile station apparatus 1 which does not support the transmission in the plurality of uplink transmission timings.

The mobile station apparatus 1 in the embodiment notifies (reports) the base station apparatus 2 of the mobile station apparatus capability which relates to the uplink transmission timing at the time of carrier aggregation. The mobile station apparatus 1 notifies the base station apparatus 2 whether or not the uplink transmission timing can be supported for each combination of frequency bands. In this way, the mobile station apparatus 1 can appropriately notify the base station apparatus 2 of its own capability. Therefore, carrier aggregation for the mobile station apparatus 1 can be appropriately configured according to state of the surrounding cells and the radio quality from the base station apparatus 2. Consequently, it is possible to improve the throughput of the mobile station apparatus 1.

In addition, the base station apparatus 2 in the embodiment can effectively configure the secondary cell of which the uplink transmission timing is different, based on the mobile station apparatus capability notified (reported) by the mobile station apparatus 1. If necessary, the base station apparatus 2 can configure the physical random access channel which is applied to the random access procedure executed in the secondary cell when the secondary cell is added or changed. In addition, by using a group identifier, the base station apparatus 2 can configure a group of cells that has the same uplink transmission timing as the secondary cell when the secondary cell is added or changed. In addition, the base station apparatus 2 can initiate the random access procedure with respect to the secondary cell, if necessary. In this way, the base station apparatus 2 can perform the appropriate scheduling based on the mobile station apparatus capability.

Here, the embodiments described above are merely examples, and various modification examples, substitution examples, and replacement examples can be used for realizing the invention. For example, the uplink transmission method here can be applied to any communication system such as FDD (frequency division duplex) and TDD (time division duplex). In addition, in the embodiments described above, an example of the communication system to which the EUTRA or the advanced EUTRA is applied is described. However, the mobile station apparatus, the base station apparatus, the communication system, the mobile station apparatus capability notification method, and the integrated circuits according to the invention can be applied to communication systems as long as the systems support a plurality of different uplink transmissions. In addition, the name of each parameter indicated in the mobile station apparatus capability is a name just for the convenience of description, even if the name of parameter in practical use and the name of parameter in the invention are different from each other, it is apparent that the spirit of the invention claimed will not be affected.

In addition, the mobile station apparatus 1 here is not limited to a mobile terminal, but the invention can also be realized by mounting the functions of the mobile station apparatus 1 to a fixed terminal.

In addition, the mobile station apparatus 1 and the base station apparatus 2 are described using the functional block diagram for the sake of convenience. However, the control of the mobile station apparatus 1 and the base station apparatus 2 may be performed by recording a program for realizing the functions of each component or a part of the function of the mobile station apparatus 1 and the base station apparatus 2 in a computer-readable recording medium, and causing the program recorded in the recording medium to be read in the computer system and to be executed. Here, the "computer system" refers to the system that includes OS and hardware such as peripheral devices.

In addition, the "computer-readable recording medium" refers to portable medium such as a semiconductor medium (for example, a RAM, or a non-volatile memory card), an optical recording medium (for example, a DVD, an MO, an MD, a CD, or a BD), a magnetic recording medium (for example, a magnetic tape, or a flexible disc), and a recording apparatus such as a disc unit that is built in the computer system. Further, the "computer-readable recording medium" includes: a medium that holds the program in a short period of time or holds dynamically such as through a communication line in a case of transmitting the program via a network such as internet or a communication line such as a telephone line, and, in above case, a medium that holds the program in a certain period of time such as in a volatile memory inside the computer system that is a server or a client server. In addition, the program described above may be a program for realizing the part of functions described above, further, may be a program that can realize the functions by a combination with a program of which the functions described above are already recorded in the computer system.

In addition, each functional block or various features of the mobile station apparatus 1 and the base station apparatus 2 used in the embodiments described above may be configured in a circuit including an LSI which is typically an IC (integrated circuit). In this case, the integration density of the LSI may be realized in any density. Each functional block or various features may individually be in chips, or a part or all of the functional blocks or various features may be integrated in a chip. In addition, the method of the integrated circuit is not limited to the LSI, but may be realized by a dedicated circuit or a general purpose processor. In addition, in a case where an integrated circuit technology that replaces the LSI appears owing to the advances in the semiconductor technology, it is also possible to use an integrated circuit according to the technology.

The embodiments of the invention are described as above based on the particularly specific examples. However, it is apparent that the scope of the invention and the claims appended hereto will not be limited to those particularly specific examples. That is, the description disclosed herein is just for the illustrative description, and is not intended to impart any limitation to the invention.

REFERENCE SIGNS LIST 1 mobile station apparatus
2 base station apparatus
11 to 13 transmission apparatus
21 to 23 reception apparatus
101, 201 reception unit
102,202 demodulation unit
103, 203 decoding unit
104 measurement processing unit
105, 204 control unit
106 random access control unit
107, 205 encoding unit
108, 206 modulation unit
109, 207 transmission unit
110 timing management unit
111, 208 higher layer
209 network signal transmission and reception unit

The invention claimed is:

1. A mobile station apparatus that is connected to a base station apparatus by aggregating a plurality of cells of which frequencies are different from each other, based on a capability of the mobile station apparatus,
   the mobile station apparatus comprising circuitry that transmits capability information, to the base station apparatus, wherein
   the capability information indicates, for band combinations each indicating a combination of a plurality of frequencies supported by the mobile station apparatus, whether the mobile station apparatus supports multiple timing advances,
   the capability information includes a list of indications each of which corresponds to one of the band combinations, each of the indications indicating, for a corresponding one of the band combinations, whether or not the multiple timing advances are supported,
   in a case where the mobile station apparatus supports the multiple timing advances for a first band combination of the band combinations which corresponds to a first indication of the list of indications, the first indication indicates that the multiple timing advances for the first band combination are supported, and
   in a case where the mobile station apparatus does not support the multiple timing advances for a second band combination of the band combinations which corresponds to a second indication of the list of indications, the second indication indicates that the multiple timing advances for the second band combination are not supported.

2. The mobile station apparatus according to claim 1, wherein each of the indications further indicates frequency band information for the corresponding one of the band combinations.

3. A base station apparatus that communicates with a mobile station apparatus by aggregating a plurality of cells of which frequencies are different from each other, based on a capability of the mobile station apparatus,
   the base station apparatus comprising:
      circuitry that receives capability information indicating, for band combinations each indicating a combination of a plurality of frequencies supported by the mobile station apparatus, whether the mobile station apparatus supports multiple timing advances, wherein
   the capability information includes a list of indications each of which corresponds to one of the band combinations, each of the indications indicating, for a corresponding one of the band combinations, whether or not the multiple timing advances are supported,
   in a case where the mobile station apparatus supports the multiple timing advances for a first band combination of the band combinations which corresponds to a first indication of the list of indications, the first indication indicates that the multiple timing advances for the first band combination are supported, and
   in a case where the mobile station apparatus does not support the multiple timing advances for a second band combination of the band combinations which corresponds to a second indication of the list of indications, the second indication indicates that the multiple timing advances for the second band combination are not supported.

4. The base station apparatus according to claim 3, wherein the base station configured to determine whether the plurality of cells of which timing advances are different from each other can be aggregated with respect to
each combination of the plurality of frequencies supported by the mobile station apparatus,
or each of the plurality of frequencies supported by the mobile station apparatus.

5. The base station apparatus according to claim 4, wherein, in a case where the plurality of cells of which timing advances are different from each other are aggregated, the base station apparatus configured to perform configuring, to the mobile station apparatus, group identifiers which indicate a group of uplink transmission timings with respect to the plurality of cells.

6. The base station apparatus according to claim 5, wherein, in a case where the plurality of cells of which the timing advances are different from each other are aggregated, the base station apparatus configured to cause the mobile station apparatus to initiate a random access procedure for acquiring the timing advances of the plurality of cells.

7. The base station apparatus according to claim 4, wherein, in a case where the plurality of cells of which timing advances are different from each other are aggregated, the base station apparatus configured to cause the mobile station apparatus to initiate a random access procedure for acquiring the timing advances of the plurality of cells.

8. The base station apparatus according to claim 3, wherein, in a case where the plurality of cells of which timing advances are different from each other are aggregated, the base station apparatus configured to perform configuring random access configuration with respect to the mobile station apparatus for implementing a random access procedure with respect to the plurality of cells.

9. The base station apparatus according to claim 8, wherein, in a case where the plurality of cells of which timing advances are different from each other are aggregated, the base station apparatus configured to cause the mobile station apparatus to initiate the random access procedure for acquiring the timing advances of the plurality of cells.

10. The base station apparatus according to claim 3, wherein each of the indications further indicates frequency band information for the corresponding one of the band combinations.

11. A processing method performed by a mobile station apparatus that is connected to a base station apparatus by aggregating a plurality of cells of which frequencies are different from each other, based on a capability of the mobile station apparatus,
the processing method comprising transmitting capability information, to the base station apparatus, wherein
the capability information indicates, for band combinations each indicating a combination of a plurality of frequencies supported by the mobile station apparatus, whether the mobile station apparatus supports multiple timing advances,
the capability information includes a list of indications each of which corresponds to one of the band combinations, each of the indications indicating, for a corresponding one of the band combinations, whether or not the multiple timing advances are supported,
in a case where the mobile station apparatus supports the multiple timing advances for a first band combination of the band combinations which corresponds to a first indication of the list of indications, the first indication indicates that the multiple timing advances for the first band combination are supported, and
in a case where the mobile station apparatus does not support the multiple timing advances for a second band combination of the band combinations which corresponds to a second indication of the list of indications, the second indication indicates that the multiple timing advances for the second band combination are not supported.

12. The processing method according to claim 11, wherein each of the indications further indicates frequency band information for the corresponding one of the band combinations.

13. A processing method in a base station apparatus that communicates with a mobile station apparatus by aggregating a plurality of cells of which frequencies are different from each other, based on a capability of the mobile station apparatus,
the processing method comprising;
receiving capability information indicating, for band combinations each indicating a combination of a plurality of frequencies supported by the mobile station apparatus, whether the mobile station apparatus supports multiple timing advances,
the capability information includes a list of indications each of which corresponds to one of the band combinations, each of the indications indicating, for a corresponding one of the band combinations, whether or not the multiple timing advances are supported,
in a case where the mobile station apparatus supports the multiple timing advances for a first band combination of the band combinations which corresponds to a first indication of the list of indications, the first indication indicates that the multiple timing advances for the first band combination are supported, and
in a case where the mobile station apparatus does not support the multiple timing advances for a second band combination of the band combinations which corresponds to a second indication of the list of indications, the second indication indicates that the multiple timing advances for the second band combination are not supported.

14. The processing method according to claim 13, further comprising determining whether the plurality of cells of which timing advances are different from each other can be aggregated with respect to
each combination of the plurality of frequencies supported by the mobile station apparatus,
or each of the plurality of frequencies supported by the mobile station apparatus.

15. The processing method according to claim 14, further comprising, in a case where the plurality of cells of which timing advances are different from each other are aggregated, configuring, to the mobile station apparatus, group identifiers which indicate a group of timing advances with respect to the plurality of cells.

16. The processing method according to claim 15, further comprising, in a case where the plurality of cells of which timing advances are different from each other are aggregated, causing the mobile station apparatus to initiate a random access procedure for acquiring the timing advances of the plurality of cells.

17. The processing method according to claim 14, further comprising, in a case where the plurality of cells of which timing advances are different from each other are aggregated, causing the mobile station apparatus to initiate a random access procedure for acquiring the timing advances of the plurality of cells.

18. The processing method according to claim 13, further comprising, in a case where the plurality of cells of which timing advances are different from each other are aggregated, configuring random access configuration with respect to the mobile station apparatus for implementing a random access procedure with respect to the plurality of cells.

19. The processing method according to claim 18, further comprising, in a case where the plurality of cells of which timing advances are different from each other are aggregated, causing the mobile station apparatus to initiate the random access procedure for acquiring the uplink transmission timings of the plurality of cells.

20. The processing method according to claim 13, wherein each of the indications further indicates frequency band information for the corresponding one of the band combinations.

\* \* \* \* \*